United States Patent
Shin et al.

(10) Patent No.: US 11,729,374 B2
(45) Date of Patent: *Aug. 15, 2023

(54) CAMERA MODULE TEST APPARATUS, CAMERA MODULE TEST METHOD AND IMAGE GENERATING DEVICE

(71) Applicant: SAMSUNG ELECTRONICS CO., LTD., Suwon-si (KR)

(72) Inventors: Deok Ha Shin, Anyang-si (KR); Eun Ji Jeong, Suwon-si (KR); Young Jun Choi, Seoul (KR)

(73) Assignee: SAMSUNG ELECTRONICS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 17/850,673

(22) Filed: Jun. 27, 2022

(65) Prior Publication Data

US 2022/0329778 A1    Oct. 13, 2022

Related U.S. Application Data

(63) Continuation of application No. 17/316,310, filed on May 10, 2021, now Pat. No. 11,375,181.

(30) Foreign Application Priority Data

Nov. 10, 2020    (KR) .................. 10-2020-0149182

(51) Int. Cl.
*H04N 17/02*    (2006.01)
*H04N 23/84*    (2023.01)
*H04N 25/13*    (2023.01)

(52) U.S. Cl.
CPC ............. *H04N 17/02* (2013.01); *H04N 23/84* (2023.01); *H04N 25/13* (2023.01)

(58) Field of Classification Search
CPC .. H04N 17/02; H04N 9/0451; H04N 9/04551; H04N 23/84; H04N 25/13
See application file for complete search history.

(56) References Cited

U.S. PATENT DOCUMENTS

| | | |
|---|---|---|
| 7,502,057 B2 | 3/2009 | Whitman et al. |
| 8,149,279 B2 | 4/2012 | Guo et al. |
| 8,868,365 B2 | 10/2014 | Huang et al. |
| 9,066,072 B2 | 6/2015 | Bai et al. |
| 9,113,096 B1 * | 8/2015 | Azuma ............... H04N 5/2253 |

(Continued)

*Primary Examiner* — Brian P Yenke
(74) *Attorney, Agent, or Firm* — Fish & Richardson P.C.

(57) ABSTRACT

A camera module test apparatus having improved performance include a coefficient data extractor that accommodates a camera module; and a test apparatus that accommodates the camera module and tests the camera module. The coefficient data extractor includes a coefficient generator that receives an image signal output from the camera module, and generates coefficient data of a ratio of a first color image signal and a second color image signal included in the image signal; and a memory device that stores the generated coefficient data. The test apparatus includes an image generator that receives an image signal from the camera module and coefficient data from the memory device, and generates a converted pattern image signal based on the image signal and the coefficient data; and a calibration data generator that generates calibration data of the converted pattern image signal.

15 Claims, 24 Drawing Sheets

(56) References Cited

U.S. PATENT DOCUMENTS

| | | |
|---|---|---|
| 9,179,113 B2 | 11/2015 | Tachi |
| 9,204,154 B2 | 12/2015 | Nakagawa et al. |
| 9,350,962 B2 | 3/2016 | Tsuchita et al. |
| 9,514,535 B1 | 12/2016 | Luo et al. |
| 9,948,849 B2 * | 4/2018 | Kim .................. H04N 5/23229 |
| 10,043,118 B2 | 8/2018 | Sumi et al. |
| 10,147,392 B2 | 12/2018 | Jung et al. |
| 10,445,849 B1 | 10/2019 | Reed et al. |
| 10,498,941 B2 | 12/2019 | Rhoads et al. |
| 10,560,642 B2 | 2/2020 | Sugiyama et al. |
| 10,594,932 B2 * | 3/2020 | Kim ................... H04N 5/2254 |
| 11,232,593 B2 | 1/2022 | Yamashita et al. |
| 11,317,063 B2 * | 4/2022 | Lee ...................... H04N 9/735 |
| 11,350,048 B1 * | 5/2022 | Magnani ............. H04N 9/0451 |
| 11,375,181 B2 * | 6/2022 | Shin ................... H04N 9/0451 |
| 2007/0076101 A1 | 4/2007 | Baer |
| 2008/0002023 A1 | 1/2008 | Cutler |
| 2009/0208101 A1 | 8/2009 | Harigai |
| 2014/0104465 A1 * | 4/2014 | Yamashita ......... H04N 9/04557 348/280 |
| 2016/0277658 A1 * | 9/2016 | Kim .................. H04N 5/23229 |
| 2017/0244961 A1 | 8/2017 | Berfanger et al. |
| 2017/0272644 A1 | 9/2017 | Chou et al. |
| 2017/0318194 A1 | 11/2017 | Chen et al. |
| 2018/0115704 A1 * | 4/2018 | Kim ......................... G02B 7/36 |
| 2021/0125570 A1 | 4/2021 | Kang et al. |
| 2021/0227185 A1 * | 7/2021 | Lee ......................... H04N 17/02 |
| 2021/0266503 A1 * | 8/2021 | Choi .................. H04N 5/36961 |
| 2021/0287333 A1 * | 9/2021 | Kang .................... G06T 3/4038 |
| 2021/0312200 A1 | 10/2021 | Ge |
| 2021/0377510 A1 | 12/2021 | Nishimura |
| 2021/0383555 A1 | 12/2021 | Shin et al. |
| 2022/0086381 A1 * | 3/2022 | Moon .................. H04N 25/133 |
| 2022/0150467 A1 * | 5/2022 | Shin ....................... H04N 17/02 |
| 2022/0182589 A1 * | 6/2022 | Sun ............................ G06T 5/40 |
| 2022/0210398 A1 * | 6/2022 | Lee ........................... G01K 1/026 |
| 2022/0277423 A1 * | 9/2022 | Jang ................... H04N 5/23229 |
| 2022/0309712 A1 * | 9/2022 | Lee ......................... G06T 5/002 |
| 2022/0385841 A1 * | 12/2022 | Yong ..................... H04N 5/357 |

* cited by examiner

| W1 | B1 | W2 | G1 |
|----|----|----|----|
| B2 | W3 | G2 | W4 |
| W5 | G3 | W6 | R1 |
| G4 | W7 | R2 | W8 |

# CAMERA MODULE TEST APPARATUS, CAMERA MODULE TEST METHOD AND IMAGE GENERATING DEVICE

CROSS-REFERENCE TO RELATED APPLICATION

This is a Continuation of U.S. application Ser. No. 17/316,310, filed May 10, 2021, and a claim priority under U.S.C. § 119 is made to Korean Patent Application No. 10-2020-0149182 filed on Nov. 10, 2020 in the Korean Intellectual Property Office, the entirety of which is hereby incorporated by reference.

BACKGROUND

The present disclosure relates to camera module test apparatuses, camera module test methods, and image generating devices.

Image sensing devices typically include semiconductor elements that convert optical information into electric signals. Charge coupled device (CCD) image sensing devices and complementary metal-oxide semiconductor (CMOS) image sensing devices are examples of image sensing devices.

A CMOS image sensor may be characterized as a CIS (CMOS image sensor). A CIS may include a plurality of pixels arranged two-dimensionally. Each of the pixels may include, for example, a photodiode (PD). The photodiodes convert incident light into electrical signals.

With development of the computer industry and the telecommunications industry, there has recently been increasing demand for image sensors having improved performance for use in digital cameras, video cameras, smartphones, game consoles, security cameras, medical micro cameras, and robots, for example.

Camera modules used in electronic devices may include image sensors. Camera module test apparatuses may be used to improve performance and prevent defects of camera modules including image sensors. For example, camera module test apparatuses may improve the performance of a camera module by determining whether the camera module is defective, and if determined defective, by storing calibration data corresponding to the defect in the camera module.

SUMMARY

Embodiments of the inventive concepts provide a camera module test apparatus, a camera module test method and an image generating device each having improved performance.

Embodiments of the inventive concepts provide a camera module test system including a coefficient data extractor removably connected to a camera module; and a test apparatus removably connected to the camera module, and that tests the camera module. The coefficient data extractor includes a coefficient generator that receives an image signal output from the camera module, and generates coefficient data corresponding to a ratio of a first color image signal and a second color image signal included in the image signal; and a memory device that stores the generated coefficient data. The test apparatus includes an image generator that receives the image signal from the camera module and the coefficient data from the memory device, and generates a converted pattern image signal based on the image signal and the coefficient data; and a calibration data generator that generates calibration data based on the converted pattern image signal.

Embodiments of the of the inventive concepts further provide a camera module test apparatus including a memory that stores first coefficient data generated based on a ratio of a first color image signal and a second color image signal output by sensing light penetrating through a first color filter having a first arrangement, and second coefficient data generated based on a ratio of a third color image signal and a fourth color image signal output by sensing the light penetrating through a second color filter having a second arrangement different from the first arrangement; and an image conversion device that selects one of the first coefficient data and the second coefficient data based on an arrangement of color filters included in an image sensor of a camera module to convert an image output from the image sensor into a converted image.

Embodiments of the of the inventive concepts still further provide a camera module test method including providing light to a first camera module; receiving a first image signal output from the first camera module in response to the light; generating coefficient data corresponding to a ratio of a first color image signal and a second color image signal included in the first image signal; storing the coefficient data; providing the light to a second camera module; receiving a second image signal output from the second camera module in response to the light and the stored coefficient data; generating a first converted pattern image signal based on the second image signal and the coefficient data received after being stored; and generating first calibration data of the first converted pattern image signal.

Embodiments of the of the inventive concepts also provide a camera module test method including providing a first camera module having a first color filter; receiving a first image signal output by sensing light penetrating through the first color filter of the first camera module; generating first coefficient data corresponding to a ratio of a plurality of color image signals included in the first image signal; storing the first coefficient data; providing a second camera module having a second color filter; checking whether the second color filter matches the first color filter; and when the second color filter matches the first color filter, generating a first converted pattern image signal based on the stored first coefficient data and a second image signal output by sensing light penetrating through the second color filter of the second camera module, and generating calibration data of the first converted pattern image signal.

Embodiments of the of the inventive concepts further provide an image generating device including a coefficient data extractor removably connected to a camera module; and an image conversion device removably connected to the camera module, and that converts an image output from the camera module into a converted image. The coefficient data extractor receives an image signal output from the camera module, and generates coefficient data corresponding to a ratio of a first color image signal and a second color image signal included in the image signal. The image conversion device converts the image into the converted image that is a gray image using the coefficient data.

Embodiments of the of the inventive concepts additionally provide a camera module test apparatus including a connector removably connected to a camera module, the camera module including an image sensor that outputs an image signal responsive to incident light; a coefficient generator that generates coefficient data corresponding to a ratio of a plurality of color image signals included in the image signal, the image signal provided to the coefficient generator through the connector; a memory device that stores the coefficient data; an image converter that receives the image signal through the connector and converts the image signal into a converted pattern image signal using the stored coefficient data; and a calibration data generator that generates calibration data based on the converted pattern image signal.

BRIEF DESCRIPTION OF THE DRAWINGS

The above and other embodiments and features of the inventive concepts will become more apparent in view of the following detailed description as made with reference to the attached drawings, in which:

FIG. 6 illustrates a diagram explanatory of an image signal according to embodiments of the inventive concepts.

DETAILED DESCRIPTION OF THE EMBODIMENTS

Hereinafter, embodiments according to the technical idea of the present disclosure will be described referring to the accompanying drawings.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
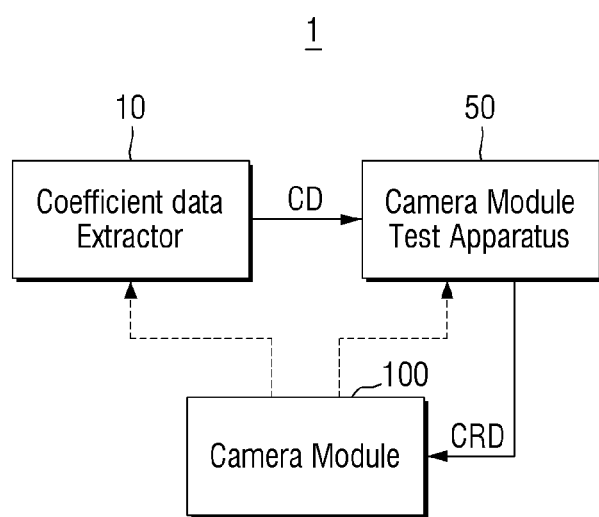
FIG. 1 illustrates a block diagram of a camera module test system according to embodiments of the inventive concepts.
Figure 2:
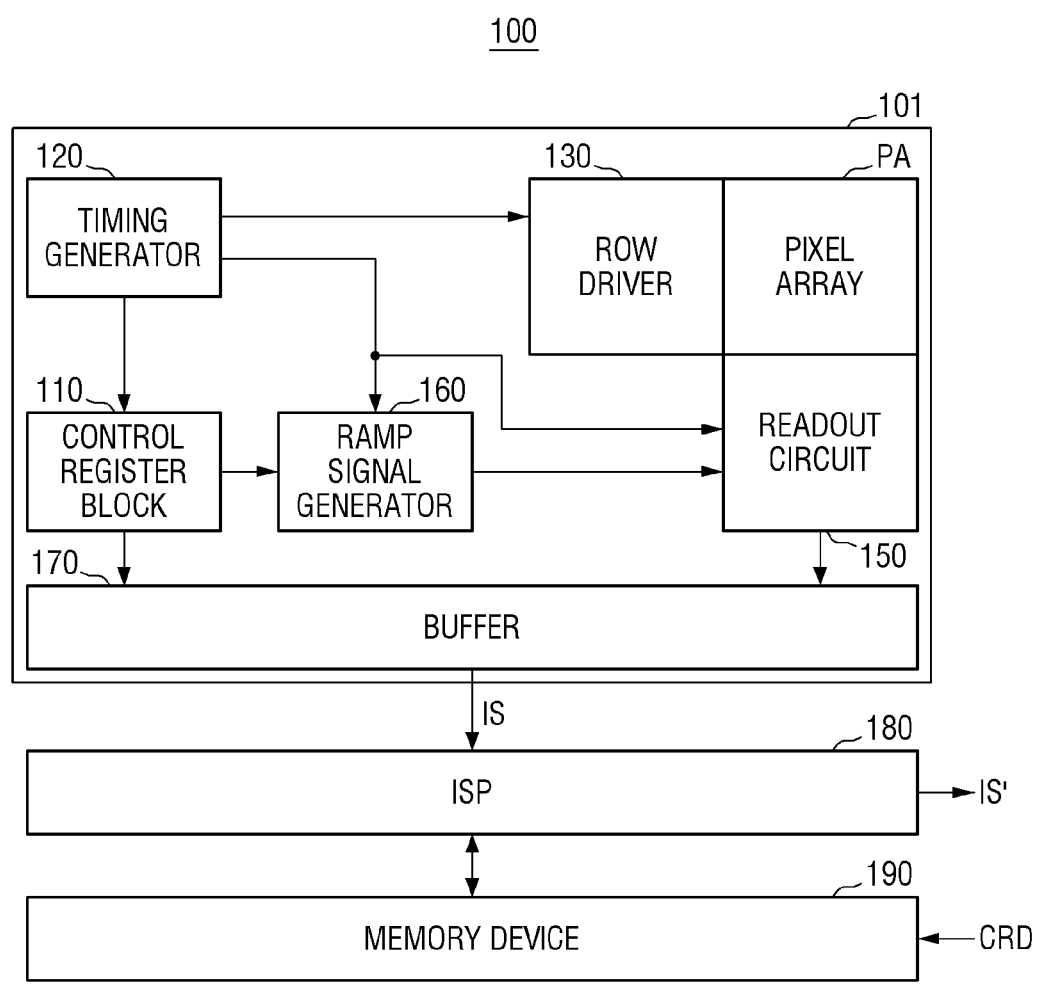
FIG. 2 illustrates a block diagram of the camera module of FIG. 1.

FIG. 1 illustrates a block diagram of a camera module test system according to embodiments of the inventive concepts. FIG. 2 illustrates a block diagram of the camera module of FIG. 1.

Referring to FIG. 1, a camera module test system 1 includes a coefficient data extractor 10 and a camera module test apparatus 50. Here, although the coefficient data extractor 10 and the camera module test apparatus 50 are shown separately, embodiments of the inventive concepts are not limited thereto. For example, the coefficient data extractor 10 and the camera module test apparatus 50 may be implemented as a single device and the operations may be performed under the same environment.

The coefficient data extractor 10 may accommodate the camera module 100, and extract coefficient data CD of the camera module 100. For example, the camera module 100 may be separately provided and connected to the coefficient data extractor 10. That is, the camera module 100 may not be included in or as part of the camera module test system 1. For example, that the coefficient data extractor 10 may accommodate the camera module 100 may mean that the camera module 100 may be removably connected to, or removably connectable with, the coefficient data extractor 10. The coefficient data extractor 10 may provide the extracted coefficient data CD to the camera module test apparatus 50.

The camera module test apparatus 50 may accommodate the camera module 100, and convert the image signal that is output from the camera module 100 into another image signal on the basis of the coefficient data CD. For example, that the camera module test apparatus 50 may accommodate the camera module 100 may mean that the camera module 100 is removably connected to or removably connectable with the camera module test apparatus 50. Also, the camera module test apparatus 50 may generate calibration data CRD, using the converted image signal.

Here, the camera module 100 used in the camera module test apparatus 50 may be the same as the camera module 100 used in the coefficient data extractor 10. However, embodiments of the inventive concepts are not limited thereto, and the camera module 100 used in the camera module test apparatus 50 may be different from the camera module 100 used in the coefficient data extractor 10.

The camera module test apparatus 50 may provide the generated calibration data CRD to the camera module 100. The calibration data CRD may include information on whether the camera module 100 is defective.

Referring to FIG. 2, the camera module 100 may include an image sensor 101, an image signal processor (ISP) 180, and a memory device 190.

The image sensor 101 may sense an image using light (not shown), to thereby generate an image signal IS. In some embodiments, although the generated image signal IS may be, for example, a digital signal, embodiments of the inventive concepts are not limited thereto and the generated image signal IS may be an analog signal.

The image signal IS may be provided to the image signal processor 180 and processed. The image signal processor 180 may receive the image signal IS that is output from the buffer 170 of the image sensor 101, and process or treat the received image signal IS to be easily displayed.

In some embodiments, the image signal processor 180 may perform digital binning on the image signal IS that is output from the image sensor 101. The image signal IS that is output from the image sensor 101 may be a raw image signal from the pixel array PA without analog binning, or the image signal IS output from the image sensor 101 may be a signal of which analog binning has already been performed.

In some embodiments, the image sensor 101 and the image signal processor 180 may be placed separately from each other, as shown. For example, the image sensor 101 may be mounted on a first chip, and the image signal processor 180 may be mounted on a second chip and may communicate with the image sensor 101 through a predetermined interface. However, the embodiments are not limited thereto, and the image sensor 101 and the image signal processor 180 may be implemented as a single package such as for example an MCP (multi-chip package).

The image signal processor 180 may be connected to a memory device 190. The calibration data CRD may be stored in the memory device 190. Here, the calibration data CRD may be provided from the camera module test system 1 of FIG. 1. The memory device 190 may include a non-volatile memory device. For example, the memory device 190 may include a memory chip such as non-volatile memory (e.g., ROM or flash memory).

The memory device 190 may provide the stored calibrated data CRD to the image signal processor 180. The image signal processor 180 may correct the image signal IS by the use of the calibration data CRD and output a calibrated image signal IS'. The image signal IS' may be provided to a display (not shown) at which a corresponding image may be displayed. However, embodiments of the inventive concepts are not limited thereto, and the image signal IS may be output and displayed.

The image sensor 101 may include a control register block 110, a timing generator 120, a row driver 130, a pixel array PA, a readout circuit 150, a ramp signal generator 160, and a buffer 170.

The control register block 110 may generally control the operation of the image sensor 101. In particular, the control register block 110 may directly transmit an operation signal to the timing generator 120, the ramp signal generator 160, and the buffer 170.

The timing generator 120 may generate a signal that serves as a reference for the operation timing of various components of the image sensor 101. The operation timing reference signal generated by the timing generator 120 may be transferred to the row driver 130, the readout circuit 150, the ramp signal generator 160, and the like.

The ramp signal generator 160 may generate and transmit a ramp signal used in the readout circuit 150. For example, the readout circuit 150 may include a correlated double sampler (CDS), a comparator, and the like, and the ramp signal generator 160 may generate and transmit a ramp signal used by the correlated double sampler (CDS), the comparator, and the like.

The buffer 170 may include, for example, a latch. The buffer 170 may temporarily store an image signal IS to be provided to the outside, and may transmit the image signal IS to an external memory or to an external device. The buffer 170 may include, for example, DRAM, SRAM, or the like. However, embodiments of the inventive concepts not limited thereto, and the buffer 1170 may include memory such as MRAM.

The pixel array PA may sense external images. The pixel array PA may include a plurality of pixels (or unit pixels). The row driver 130 may selectively activate rows of the pixel array PA.

The readout circuit 150 may sample the pixel signal provided from the pixel array PA, compare it to the ramp signal, and then convert an analog image signal (data) into a digital image signal (data) on the basis of the results of the comparison.

Figure 3:
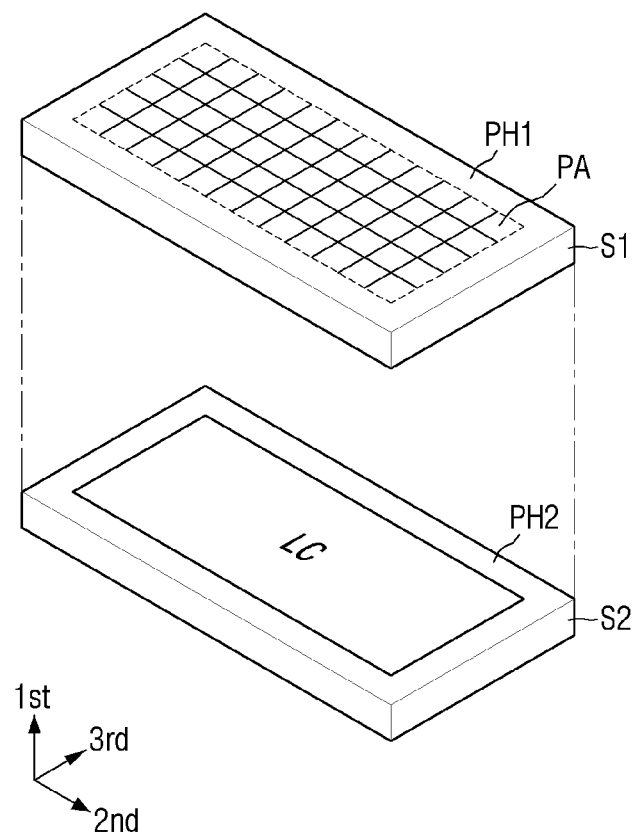
FIG. 3 illustrates a diagram showing a conceptual layout of an image sensor according to embodiments of the inventive concepts.

FIG. 3 illustrates a diagram showing a conceptual layout of an image sensor according to embodiments of the inventive concepts.

Referring to FIG. 3, the image sensor 101 may include a first region S1 and a second region S2 stacked in a first direction (e.g., a vertical direction). The first region S1 and the second region S2 may extend in a second direction and a third direction intersecting the first direction, and blocks shown in FIG. 2 may be placed in the first region S1 and the second region S2.

Although not shown in the drawings, a third region in which the memory is placed may be placed below the second region S2. The memory placed in the third region may receive, store or process the image data from the first region S1 and the second region S2, and re-transmit the image data to the first region S1 and the second region S2. In this case, the memory may include memory elements such as DRAM (dynamic random access memory), SRAM (static random access memory), STT-MRAM (spin transfer torque magnetic random access memory), and flash memory. When the memory includes, for example, DRAM, the memory may receive and process image data at a relatively high speed. Also, in some embodiments, the memory may also be placed in the second region S2.

The first region S1 may include a pixel array PA and a first peripheral region PH1, and the second region S2 may include a logic circuit region LC and a second peripheral region PH2. The first region S1 and the second region S2 may be sequentially stacked one above the other.

In the first region S1, the pixel array PA may be the same as the pixel array PA described referring to FIG. 2. A pixel array PA may include a plurality of unit pixels arranged in the form of a matrix. Each pixel may include a photo diode and transistors. A more specific description thereof will be provided hereinafter.

The first peripheral region PH1 may include a plurality of pads, and may be placed around the pixel array PA. The plurality of pads may transmit and receive electrical signals from an external device or the like.

In the second region S2, a logic circuit region LC may include electronic elements including a plurality of transistors. The electronic elements included in the logic circuit region LC may be electrically connected to the pixel array PA to provide a constant signal to each unit pixel of the pixel array PA or control the output signal.

For example, the control register block 110, the timing generator 120, the row driver 130, the readout circuit 150, the ramp signal generator 160, the buffer 170, and the like described referring to FIG. 2 may be placed in the logic circuit region LC. For example, blocks from among the blocks of FIG. 2 other than the pixel array PA may be placed in the logic circuit region LC.

Also in the second region S2, the second peripheral region PH2 may be placed in the region corresponding to the first peripheral region PH1 of the first region S1. However, embodiments of the inventive concepts are not limited thereto.

Figure 4:
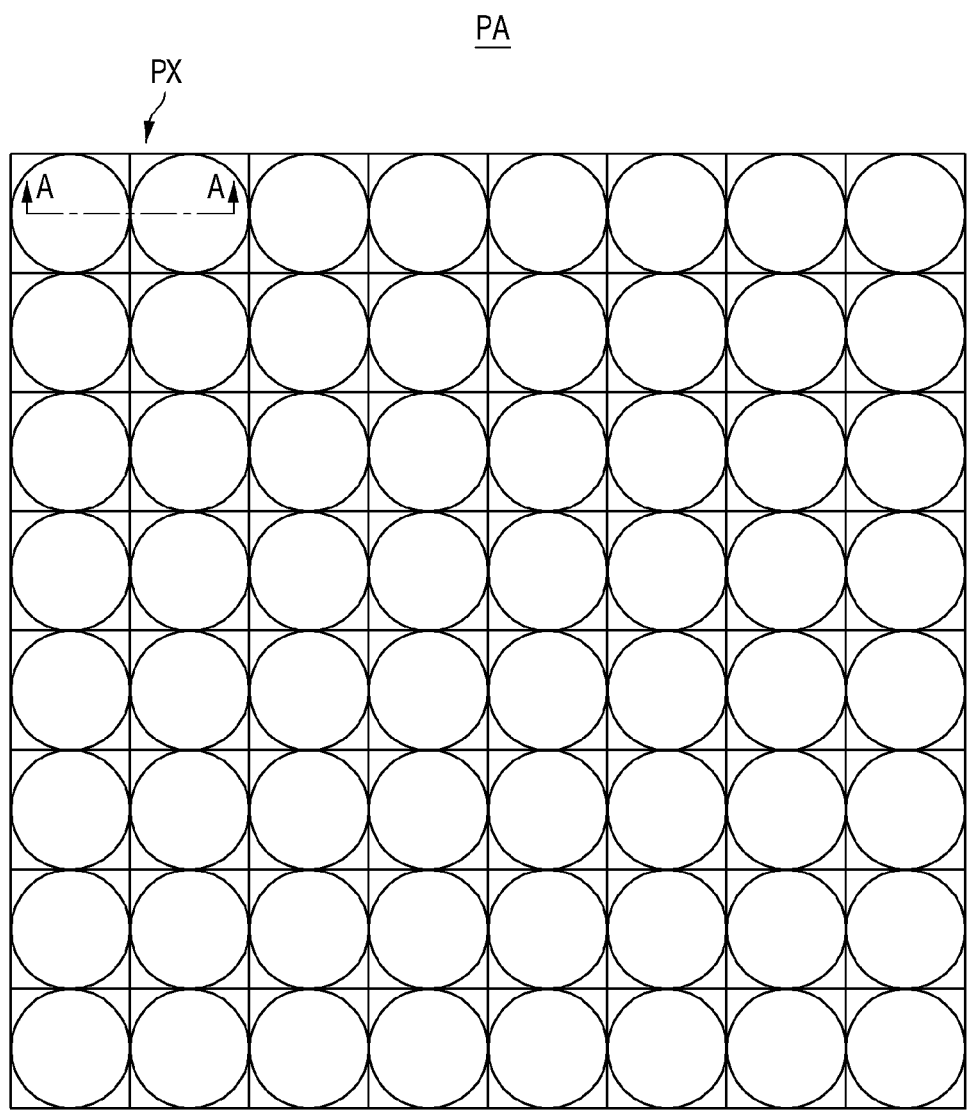
FIG. 4 illustrates a diagram explanatory of a pixel array according to embodiments of the inventive concepts.
Figure 5:
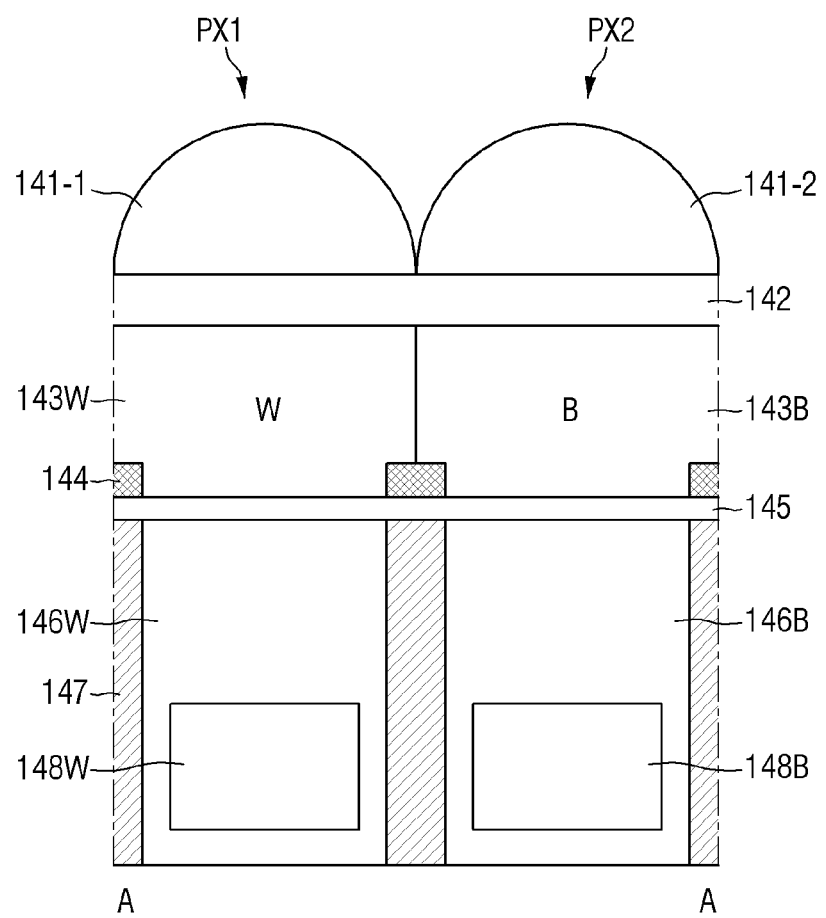
FIG. 5 illustrates a cross-sectional view of the pixel array taken along a line A-A of FIG. 4.

FIG. 4 illustrates a diagram explanatory of a pixel array according to embodiments of the inventive concepts. FIG. 5 illustrates a cross-sectional view of the pixel array taken along a line A-A of FIG. 4.

Referring to FIG. 4, the pixel array PA may include a plurality of unit pixels PX. A plurality of unit pixels PX may be arranged two-dimensionally. For example, a plurality of unit pixels PX may be placed repeatedly in the second direction and the third direction (e.g., see FIG. 3). The unit pixels PX may be arranged at regular intervals. For example, pixel arrays PA may be arranged in a Bayer pattern. However, embodiments of the inventive concepts are not limited thereto, and the pixel array PA may also be arranged in a tetra pattern, a nona pattern, or the like.

Referring to FIG. 5, the pixel array PA may include a unit pixel PX1 and a unit pixel PX2. The unit pixel PX1 and the unit pixel PX2 may be arranged to be adjacent to each other.

The pixel array PA may include substrates 146W and 146B, photoelectric transistors 148W and 148B, an antireflection film 147, a side antireflection film 144, color filters 143W and 143B, an upper flattening film 142, a lower flattening film 145, and microlenses 141-1 and 141-2.

As the substrates 146W and 146B, for example, a P-type or N-type bulk substrate may be used, a P-type or N-type epi layer grown on the P-type bulk substrate may be used, or a P-type or N-type epi layer grown on the N-type bulk substrate may be used. The substrates 146W and 146B may also include a substrate such as an organic plastic substrate, in addition to the semiconductor substrate.

The photoelectric transistors 148W and 148B may be photo diodes, photo transistors, photo gates, pinned photo diodes, or a combination thereof.

The antireflection film 147 and the side antireflection film 144 may prevent light, which is incident on the external microlenses 141-1 and 141-2 from outside, from penetrating a region W and a region B. The antireflection film 147 and the side antireflection film 144 may be an insulating film such as silicon oxide film, silicon nitride film, silicon oxynitride film, a resin and a combination thereof, or a laminate thereof. However, the embodiments are not limited thereto.

The upper flattening film 142 and the lower flattening film 145 may be formed flat with the color filters 143W and 143B interposed therebetween. The upper flattening film 142 and the lower flattening film 145 may include at least one of silicon oxide film-based material, silicon nitride film-based material, a resin or a combination thereof. However, embodiments are not limited thereto.

Figure 6:
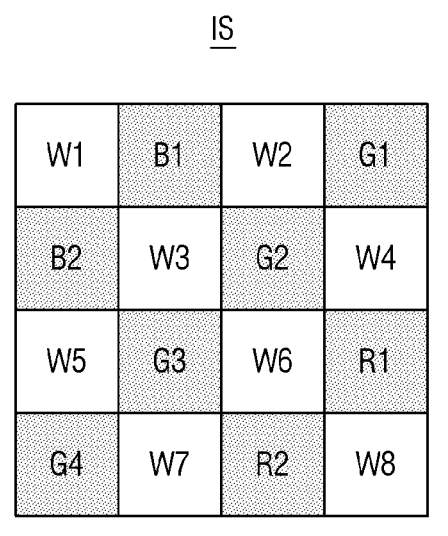

FIG. 6 illustrates a diagram explanatory of an image signal according to embodiments of the inventive concepts.

Referring to FIG. 6, the image signal IS may be a signal which is output by sensing the light from the pixel array PA by the image sensor 101. For example, light may penetrate through the color filters 143W and 143B of the pixel array PA and reach the photoelectric transistors 148W and 148B, and the image signal IS may be output from the logic circuit region LC in response to this.

For example, the image signal IS may include a first white pixel value W1 which is output by sensing the light penetrating through a color filter 143W having a white color. Also, the image signal IS may include a blue pixel value B1 which is output by sensing the light penetrating through a color filter 143B having a blue color. That is, the white pixel values W1 to W8, the green pixel values G1 to G4, the blue pixel values B1 and B2, and the red pixel values R1 and R2 shown in FIG. 6 may be an image signal IS which is output by sensing the light penetrating through color filters having the corresponding color by the image sensor 101.

The pixel array PA may be arranged in an RGBW Bayer pattern. That is, the color filters of the pixel array PA may be a combination of a red color filter, a green color filter, a blue color filter and a white color filter, and the color filters may be arranged in a Bayer pattern. However, embodiments of the inventive concepts are not limited thereto, and the pixel array PA may for example be arranged in an RGB Bayer pattern, an RGB tetra pattern, a CMY pattern, a RYYB pattern, and the like.

The pixel values of the image signal IS may be arranged to correspond to the colors of the color filters of the pixel array PA, as shown in FIG. 6. However, FIG. 6 is merely an arrangement of each pixel value according to the position of each unit pixel PX, and the storage position of the pixel value of the actually output image signal IS is not limited to the shown position.

Figure 7:
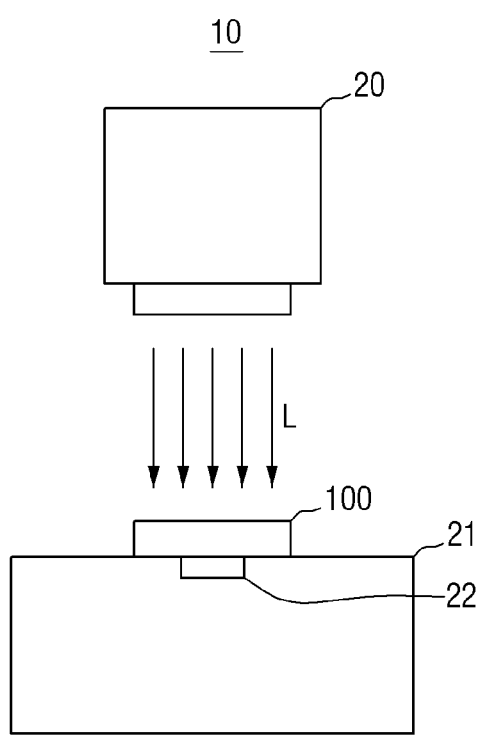
FIG. 7 illustrates a coefficient data extractor according to embodiments of the inventive concepts.
Figure 8:
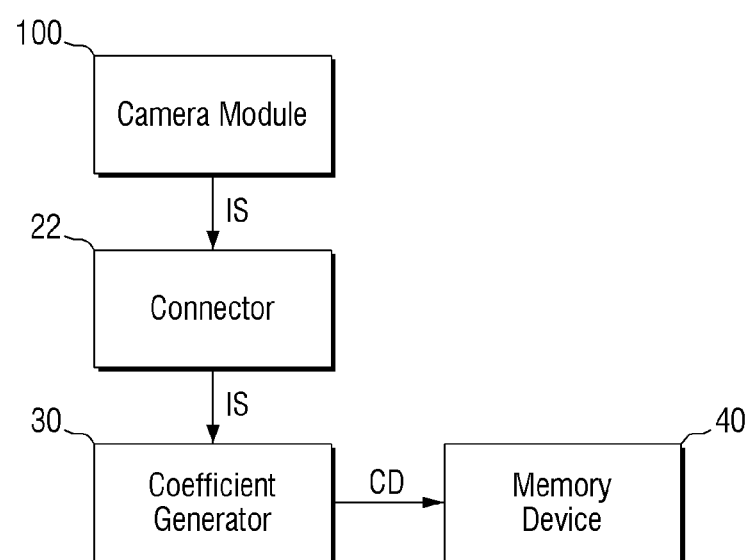
FIG. 8 illustrates a block diagram of the coefficient data extractor of FIG. 7.
Figure 9:
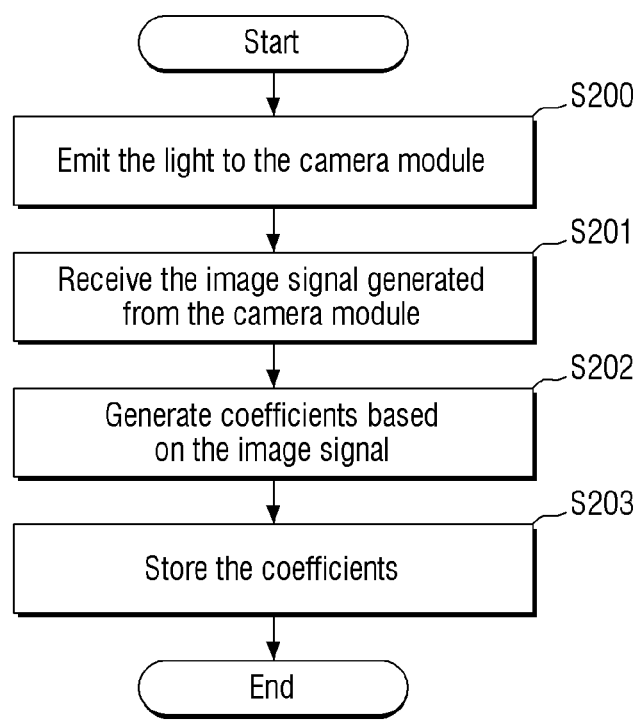
FIG. 9 illustrates a flowchart explanatory of operation of the coefficient data extractor according to embodiments of the inventive concepts.

FIGS. 7 and 8 illustrate diagrams explanatory of a coefficient data extractor according to embodiments of the inventive concepts. FIG. 9 illustrates a flowchart explanatory of the operation of the coefficient data extractor according to embodiments of the inventive concepts.

Referring to FIG. 7, the coefficient data extractor 10 included in the camera module test system 1 may include a light source emitter 20, a fixer 21, and a connector 22.

Referring to FIGS. 7 to 9, the camera module 100 may be accommodated inside the coefficient data extractor 10. That is, the camera module 100 may be provided to the coefficient data extractor 10 of the camera module test system 1 from the outside. For example, the camera module 100 may be externally connected to the coefficient data extractor 10.

The camera module 100 may be placed on the fixer 21 and may be connected to the connector 22. Also, the camera module 100 may be fixed on the fixer 21. An interface or a connector of the camera module 100 may be connected to the connector 22 of the coefficient data extractor 10 to transmit and receive data. For example, as shown in FIG. 8, the image signal IS output from the camera module 100 may be transferred to the connector 22. Further, the image signal IS may be transferred to the coefficient generator 30 through the connector 22.

The light source emitter 20 is placed above the fixer 21 and the camera module 100. The light source emitter 20 emits light L to the camera module 100 (S200 in FIG. 9). Here, the light L may include, for example, EDS light (Electric die sorting light). For example, the light L may include white light. That is, the light L emitted from the light source emitter 20 may include light of all wavelengths. The light L may include all of light of the red component, light of the green component, and light of the blue component. However, embodiments of the inventive concepts are not limited thereto.

The camera module 100 may allow light L emitted from the light source emitter 20 to enter. For example, the image sensor 101 of the camera module 100 may sense light L and output the image signal IS. Here, the light L that has reached the pixel array PA is converted by the photoelectric transistors 148W and 148B and may be output as the image signal IS by the readout circuit 150.

The coefficient generator 30 receives the image signal IS generated from the camera module 100 (S201).

The coefficient generator 30 generates coefficients on the basis of the image signal IS (S202). That is, the coefficient generator 30 may generate the coefficient data CD, using the image signal IS.

Figure 10:
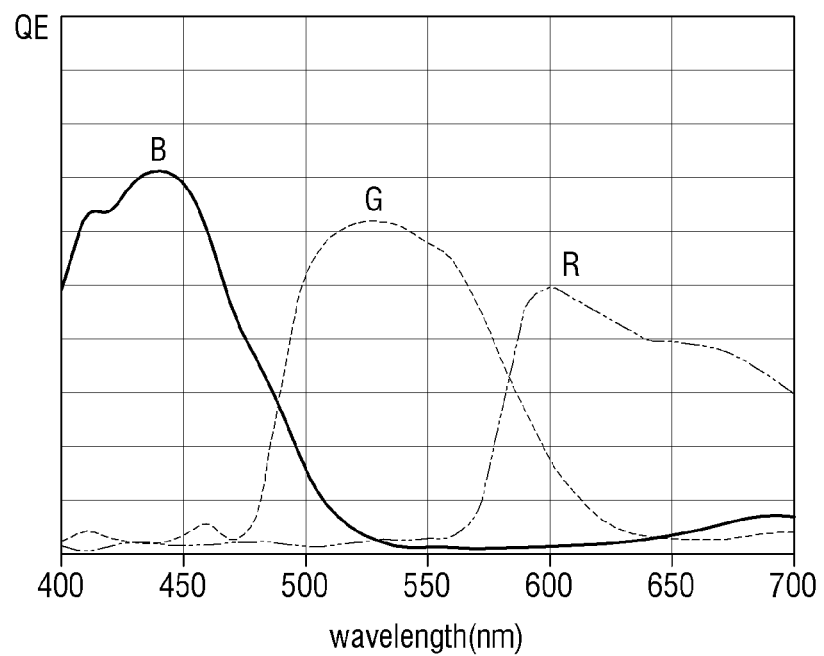
FIG. 10 illustrates a graph explanatory of the quantum efficiency of an image signal according to embodiments of the inventive concepts.

FIG. 10 illustrates a graph explanatory of the quantum efficiency of an image signal according to embodiments of the inventive concepts.

Referring to FIG. 10, a quantum efficiency QE of each color image signal may be different from each other, depending on the wavelength. For example, the quantum efficiency of a blue color image signal B may be large at a short wavelength of 450 nm, and may be small at a long wavelength of 650 nm. For example, the quantum efficiency of a green color image signal G may be large at an intermediate wavelength of 550 nm, and may be small at a short wavelength of 450 nm and a long wavelength of 650 nm. For example, the quantum efficiency of a red color image signal R may be large at a long wavelength of 650 nm, and may be small at a short wavelength of 450 nm. Each color image signal may be changed depending on the wavelength. However, embodiments of the inventive concepts are not limited thereto.

Here, the magnitude of the white color image signal W may correspond to an integral value of the wavelengths of the magnitude of the green color image signal G, the magnitude of the red color image signal R, and the magnitude of the blue color image signal B. That is, the magnitude of the white color image signal W may be expressed by the following Equation 1.

$$W=\int_{\lambda_{min}}^{\lambda_{max}} C1*R+C2*G+C3*B d\lambda \quad \text{<Equation 1>}$$

The white color image signal W may be expressed linearly, using the green color image signal G, the red color image signal R, and the blue color image signal B. The magnitude of the white color image signal W may be expressed by Equation 2 below.

$$W=C1R+C2*G+C3*B \quad \text{<Equation 2>}$$

That is, the white color image signal W may be made up of a constant ratio of the green color image signal G, the red color image signal R, and the blue color image signal B, wherein C1, C2 and C3 respectively are the magnitudes of the red color image signal, the green color image signal and the blue color image signal.

Each of the green color image signal G, the red color image signal R, and the blue color image signal B may have a certain relational expression with respect to each other. The green color image signal G expressed with respect to the blue color image signal B may correspond to Equation 3 below, and the red color image signal R expressed with respect to the blue color image signal B may correspond to Equation 4 below.

$$G=k1*B+k2 \quad \text{<Equation 3>}$$

$$R=k3*+k4 \quad \text{<Equation 4>}$$

When Equations 3 and 4 are substituted into Equation 2, the following Equation is obtained.

$$\begin{aligned} W &= C1*(k3*B+k4)+ \\ &\quad C2*(k1*B+k2)+C3*B \\ &= (C1*k3+C2*k1+C3)*B+ \\ &\quad (C1*k4+C2*k2) \\ &= XB*B+KB \end{aligned} \quad \text{(Equation 5)}$$

Accordingly, the white color image signal W may be expressed using the blue color image signal B. That is, the white color image signal W may be expressed using the blue color coefficient XB and the blue color constant KB.

The white color image signal W may be expressed using the red color image signal R, and may be expressed using the green color image signal G. Equations thereof are as follows:

$$X=XR*R+KR \quad \text{<Equation 6>}$$

$$W=XG*G+KG \quad \text{<Equation 7>}$$

Here, the white color image signal W may be expressed using the red color coefficient XR and the red color constant KR. Also, the white color image signal W may be expressed using the green color coefficient XG and the green color constant KG.

Here, when the light L includes all wavelengths, the constants of each relational expression may be omitted. For example, the blue color constant KB, the red color constant KR, and the green color constant KG may be omitted from each Equation. Thus, the relational expression of each color image signal is as follows. However, embodiments of the inventive concepts are not limited thereto.

$$W=XB*B$$

$$W=XR*R$$

$$W=XG*G \quad \text{<Equation 8>}$$

Thus, the coefficient generator 30 may generate coefficient data CD on the basis of the image signal IS. Here, the coefficient data CD may include a blue color coefficient XB, a red color coefficient XR, and a green color coefficient XG. That is, the coefficient data may be a ratio of a single color image signal to another color image signal.

Subsequently, the coefficient data extractor 10 may store the coefficient data CD in the memory device 40 (S203 in FIG. 9). The coefficient generator 30 may provide the generated coefficient data CD to the memory device 40. The memory device 40 may store the provided coefficient data CD. Here, the memory device 40 may store the coefficient data CD to match the type of camera module 100 used for the coefficient data extractor 10. For example, when the color filter type of the camera module 100 is RGBW, the coefficient data CD generated in the case of RGBW may be stored. However, embodiments of the inventive concepts are not limited thereto.

A method of extracting the coefficient data CD described referring to FIGS. 7 to 10 may be performed before the test method of the camera module 100 is performed. That is, if a plurality of camera modules 100 need to be tested, the coefficient data CD of only one representative camera module 100 may be extracted. Next, a plurality of camera modules 100 may be tested, using the coefficient data CD. This makes it possible to reduce the test time of the camera module test apparatus 50, and the camera module 100 can be tested, even without hardware which converts a specific image signal to an RGB image signal. That is, performance of the camera module test system 1 can be improved.

Figure 11:
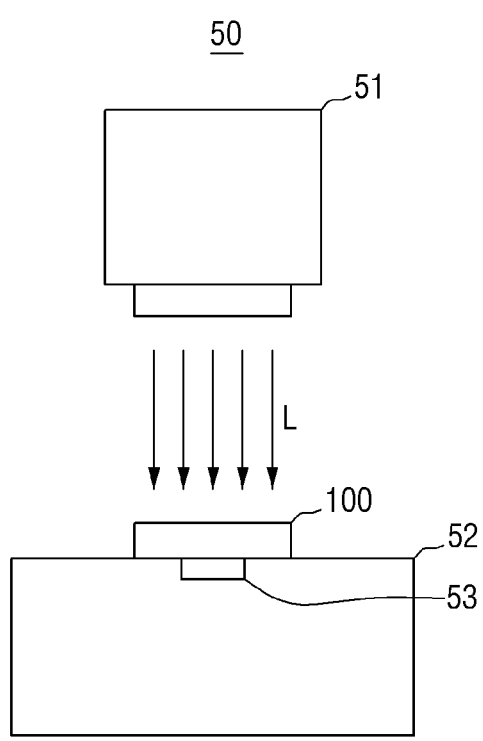
FIG. 11 illustrates a camera module test apparatus according to embodiments of the inventive concepts.
Figure 12:
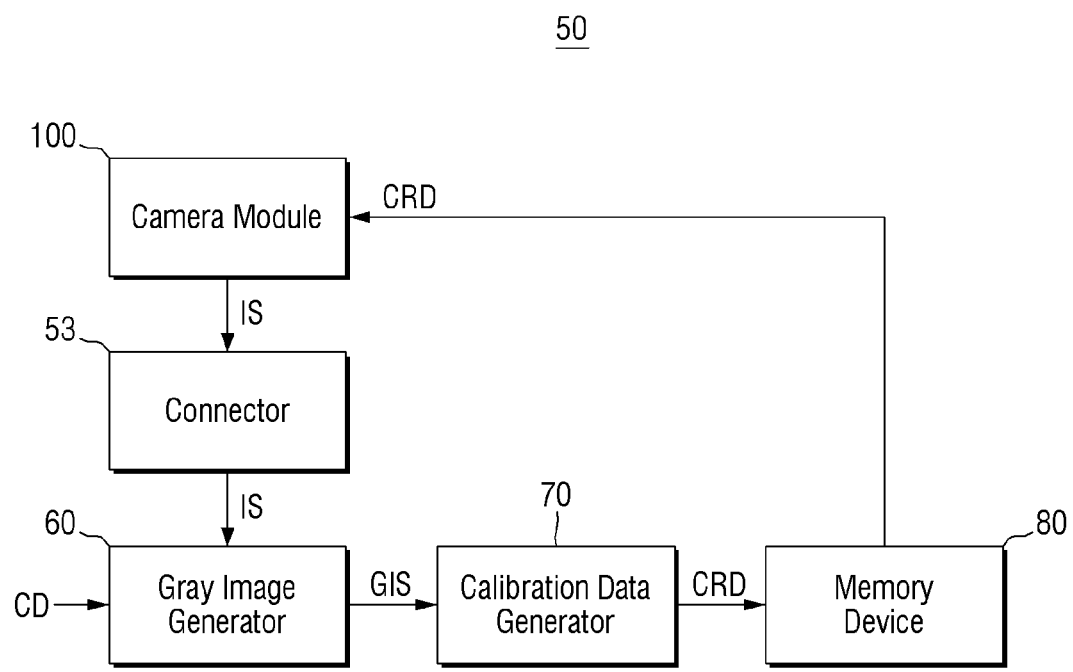
FIG. 12 illustrates a block diagram of the camera module test apparatus of FIG. 11.
Figure 13:
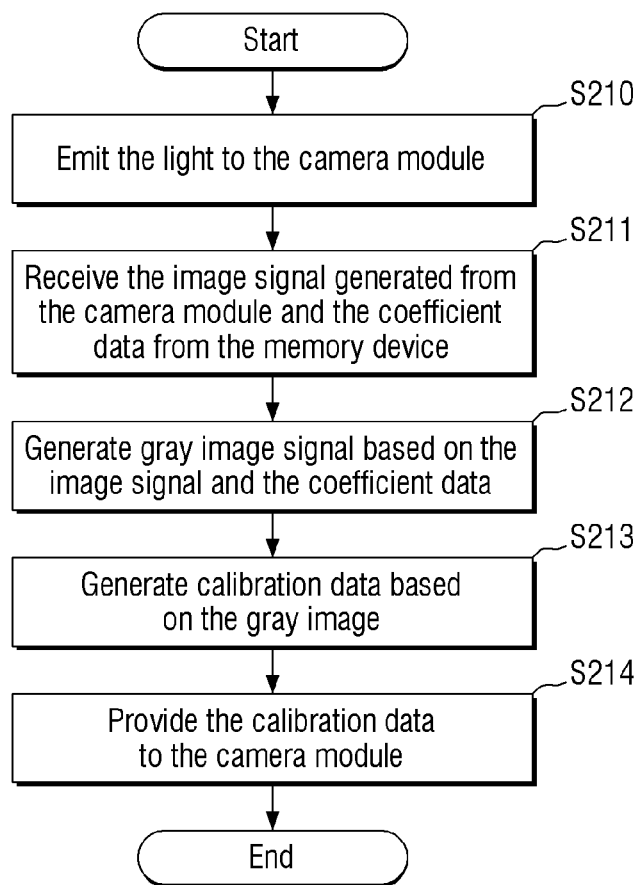
FIG. 13 illustrates a flowchart explanatory of operation of the camera module test apparatus according to embodiments of the inventive concepts.
Figure 14:
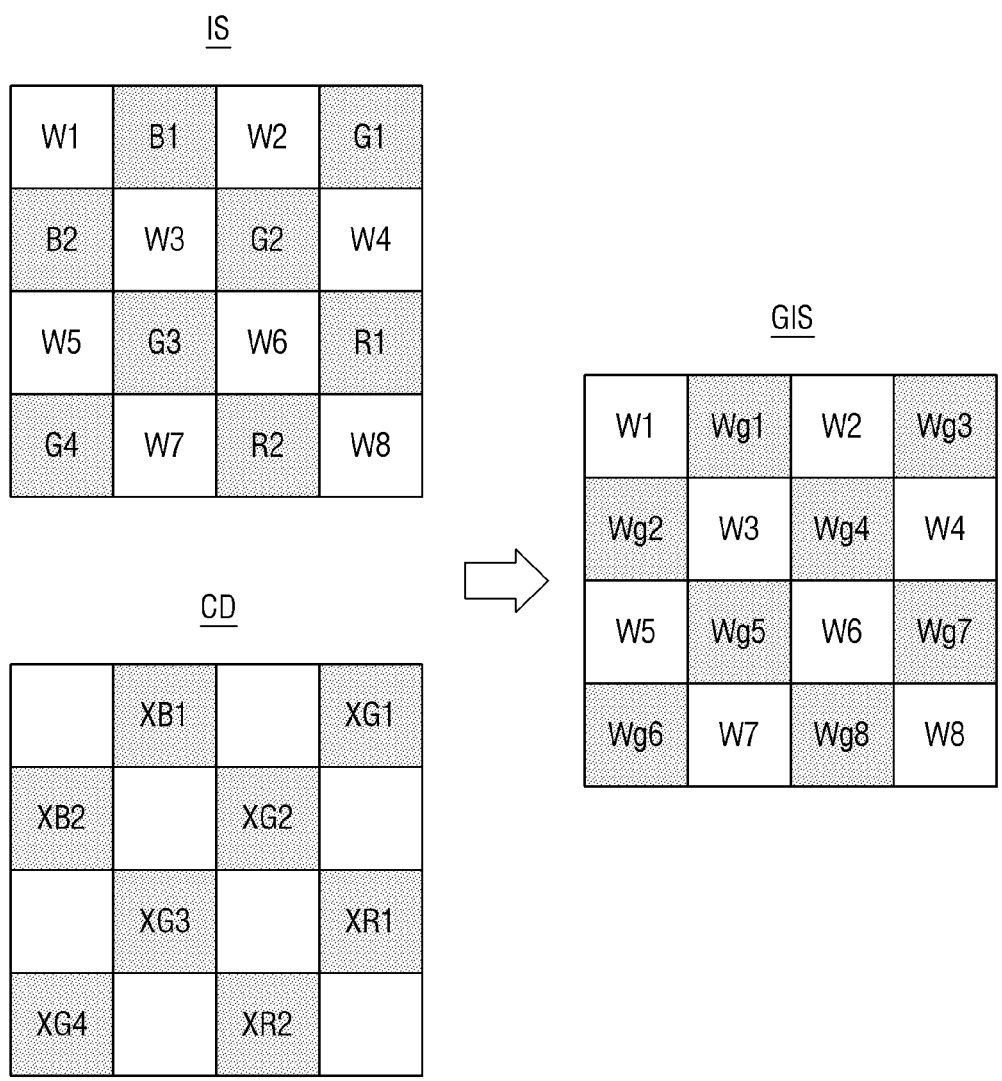
FIGS. 14 and 15 illustrate diagrams explanatory of the operation of the camera module test apparatus of FIGS. 11 to 13.
Figure 15:
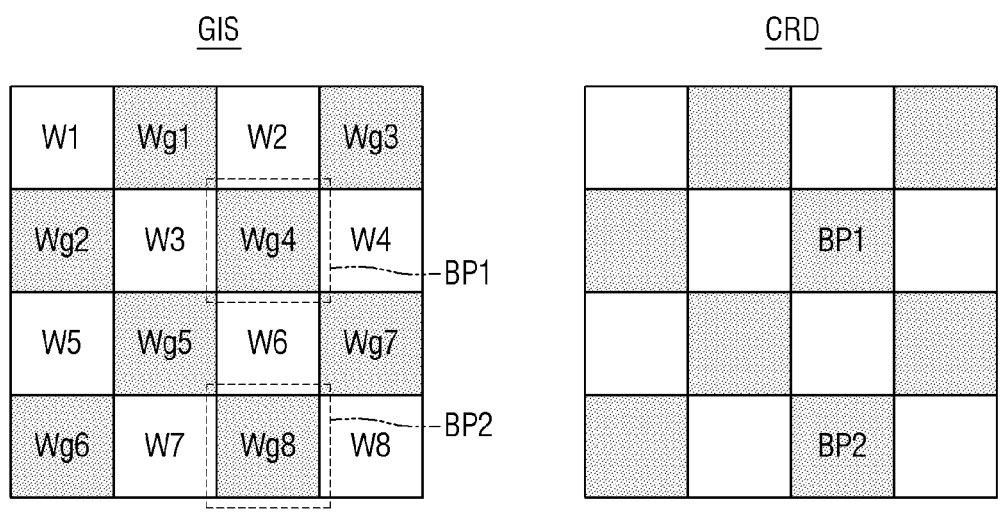

FIGS. 11 and 12 illustrate diagrams explanatory of a camera module test apparatus according to embodiments of the inventive concepts. FIG. 13 illustrates a flowchart explanatory of the operation of the camera module test apparatus according to embodiments of the inventive concepts. FIGS. 14 and 15 illustrate diagrams explanatory of the operation of the camera module test apparatus of FIGS. 11 to 13.

Referring to FIG. 11, the camera module test apparatus 50 included in the camera module test system 1 may include a light source emitter 51, a fixer 52, and a connector 53.

Referring to FIGS. 11 to 13, the camera module 100 may be accommodated inside the camera module test apparatus 50. That is, the camera module 100 may be provided to the camera module test apparatus 50 of the camera module test system 1 from the outside. For example, the camera module 100 may be externally connected to the camera module test apparatus 50.

The camera module 100 may be placed on the fixer 52 and may be connected to the connector 53. Also, the camera module 100 may be fixed on the fixer 52. An interface or a connector of the camera module 100 may be connected to the connector 53 of the camera module test apparatus 50 to transmit and receive data. For example, as shown in FIG. 12, the image signal IS which is output from the camera module 100 may be transferred to the connector 53. Also, the image signal IS may be transferred to a gray image generator 60 through the connector 53.

The light source emitter 51 is placed above the fixer 52 and the camera module 100. The light source emitter 51 emits light L to the camera module 100 (S210 in FIG. 13). Here, the light L may include, for example, white light. The camera module 100 may output an image signal IS in response to the incident light L.

The gray image generator 60 receives the image signal IS generated from the camera module 100 through the connector 53, and the coefficient data CD from the memory device 40 of the coefficient data generator 10 such as shown in FIG. 8 (S211). The gray image generator 60 may receive coefficient data CD previously stored in the memory device 40. Here, the coefficient data CD may be generated and stored prior to the operation of the camera module test apparatus 50.

In this embodiment, although the camera module test apparatus 50 and the coefficient data extractor 10 are shown as being placed separately, the camera module test apparatus 50 and the coefficient data extractor 10 may be implemented in a single device. That is, the operation of the camera module test apparatus 50 and the coefficient data extractor 10 may be performed under the same environment. That is, the light L used in the camera module test apparatus 50 and the coefficient data extractor 10 may be the same, and the camera module 100 may also be the same. However, embodiments of the inventive concepts are not limited thereto.

The gray image generator 60 generates a gray image signal GIS on the basis of the image signal IS and the coefficient data CD (S212). That is, the gray image generator 60 may convert the image signal IS generated from the camera module 100 into a gray image signal GIS, using the coefficient data CD. Here, the image signal generated from the gray image generator 60 is not limited to the gray image signal GIS. That is, the gray image generator 60 may generate another converted pattern image signal. For example, the gray image generator 60 may also convert the image signal IS into the RGB Bayer pattern image signal using the coefficient data CD. However, embodiments of the inventive concepts are not limited thereto.

Referring to FIG. 14, the image signal may include white pixel values W1 to W8, green pixel values G1 to G4, blue pixel values B1 and B2, and red pixel values R1 and R2. The coefficient data CD stored in the memory device 40 may include the blue color coefficients XB1 and XB2, red color coefficients XR1 and XR2, green color coefficients XG1, XG2, XG3 and XG4, and the like. Here, the blue color coefficients XB1 and XB2 may respectively correspond to the blue pixel values B1 and B2, and the red color coefficients XR1 and XR2 may respectively correspond to the red pixel values R1 and R2, and the green color coefficients XG1, XG2, XG3 and XG4 may respectively correspond to the green pixel values G1 to G4.

The gray image signal GIS may be generated by applying the coefficient data CD to the image signal IS. For example, a gray pixel value Wg1 may be generated on the basis of a blue pixel value B1 and a blue color coefficient XB1 according to Equation 9 below.

$$Wg1 = B1 * XB1 \qquad \text{<Equation 9>}$$

Also, the gray pixel value Wg3 may be generated on the basis of the green pixel value G1 and the green color coefficient XG1 according to Equation 10 below.

$$Wg3 = G1 * XG1 \qquad \text{<Equation 10>}$$

Also, the gray pixel value Wg7 may be generated on the basis of the red pixel value R1 and the red color coefficient XR1 according to Equation 11 below.

$$Wg7 = R1 * XR1 \qquad \text{<Equation 11>}$$

Therefore, the gray image signal GIS may be generated on the basis of the image signal IS and the coefficient data CD. The gray image signal GIS may include a gray image. That is, an image signal IS having an original image may be converted into a gray image signal GIS having a gray image. The gray image signal GIS may be provided to the calibration data generator 70.

The calibration data generator 70 may process the image signal or the gray image signal of the RGB Bayer pattern. However, to generate the calibration data CRD, hardware or the like that converts an image signal other than the image signal or the gray image signal of the RGB Bayer pattern into a corresponding signal may be required. However, in embodiments of the inventive concepts, because the coefficient data CD stored previously may be applied to the image signal IS to generate the gray image signal GIS, the calibration data generator 70 may generate the calibration data CRD on the basis of the generated gray image signal GIS.

The calibration data generator 70 thus generates calibration data CRD on the basis of the gray image of the gray image signal GIS (S213 in FIG. 13).

The calibration data generator 70 may for example perform a shading test, a bad pixel test, a FPN test, or the like on the generated gray image signal GIS. Although the calibration data generator 70 may perform various types of tests, in embodiments of the inventive concepts, testing of bad pixels will be hereinafter described as an example.

Referring to FIG. 15, in the gray image signal GIS, the pixel corresponding to a gray pixel value Wg4 and the pixel corresponding to a gray pixel value Wg8 may be tested as bad pixels. As a result, the pixel corresponding to the gray pixel value Wg4 may be expressed as a bad pixel BP1, and the pixel corresponding to the gray pixel value Wg8 may be expressed as a bad pixel BP2.

Thus, the calibration data CRD may include information about which pixels are bad pixels. For example, the calibration data CRD may include an indication in which the pixel corresponding to the gray pixel value Wg4 is the bad pixel BP1, and may include an indication in which the pixel corresponding to the gray pixel value Wg8 is the bad pixel BP2. However, embodiments of the inventive concepts are not limited thereto.

Referring to FIGS. 12 and 13 again, the calibration data generator 70 provides calibration data CRD to the camera module 100 (S214). The calibration data generator 70 may provide the generated calibration data CRD to the memory device 80. Here, the memory device 80 may be a volatile memory device such as DRAM, or may be a non-volatile memory device such as flash memory. The memory device 80 may also be the same as the memory device 40 in FIG. 8. The calibration data CRD which is read from the memory device 80 may be transferred to the camera module 100.

Figure 16:
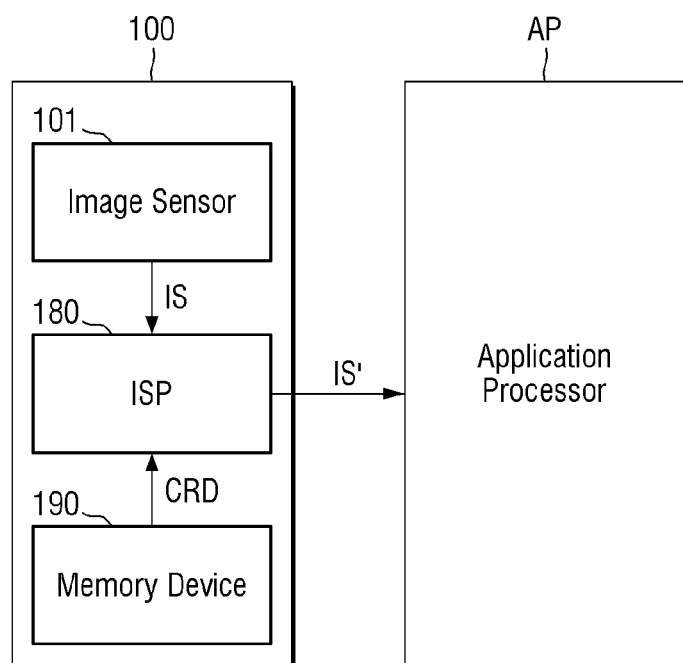
FIG. 16 illustrates a block diagram of an image sensing apparatus according to embodiments of the inventive concepts.
Figure 17:
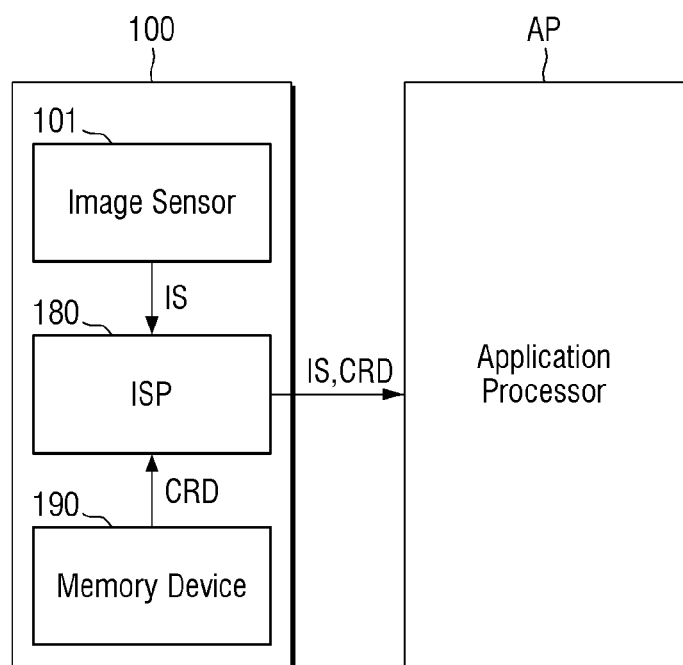
FIG. 17 illustrates a block diagram of an image sensing apparatus according to embodiments of the inventive concepts.

FIGS. 16 and 17 illustrate block diagrams of an image sensing device according to embodiments of the inventive concepts.

Referring to FIGS. 2 and 16, an image sensing apparatus 300a may include a camera module 100 and an application processor AP.

A memory device 190 of the camera module 100 may receive the calibration data CRD from the memory device 80. The memory device 190 may store the calibration data CRD. The memory device 190 may provide the calibration data CRD to the image signal processor 180 in response to an external request. That is, when the image signal processor 180 executes image processing on the image signal IS, the image signal IS may be calibrated, using the calibration data CRD stored in the memory device 190. That is, the camera module 100 may output an image signal IS' having further improved image quality, by correcting the image signal IS, using the calibration data CRD generated from the camera module test system 1.

The calibrated image signal IS' may be provided to the application processor AP. The application processor AP may additionally perform the image processing on the provided image signal IS'. Further, the image signal IS' subjected to the image processing may be output through a display.

However, embodiments of the inventive concepts are not limited thereto, and the application processor AP may also output the image signal IS' to the display as is without performing additional image processing.

Referring to FIG. 17, an image sensing apparatus 300b may include a camera module 100 and an application processor AP.

The image signal processor 180 of the camera module 100 may receive the calibration data CRD from the memory device 190. The image signal processor 180 may provide the image signal IS and the calibration data CRD to the application processor AP. That is, the image signal processor 180 may not perform image processing on the image signal IS using the calibration data CRD. The application processor AP may perform image processing of the image signal IS using the provided calibration data CRD.

A camera module test system 1a according to some other embodiments of the inventive concepts will be described below referring to FIGS. 18 and 19.

Figure 18:
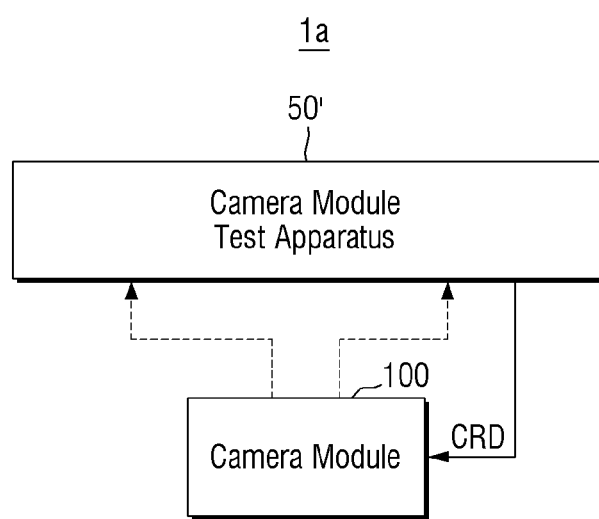
FIG. 18 illustrates a block diagram of a camera module test system according to embodiments of the inventive concepts.

FIG. 18 illustrates a block diagram of a camera module test system according to embodiments of the inventive concepts. FIG. 19 illustrates a block diagram of the camera module test apparatus of FIG. 18. For convenience of explanation, description of features in FIGS. 18 and 19 that are the same as in FIGS. 1 to 17 will be hereinafter omitted.

Referring to FIG. 18, the camera module test system 1a may include a camera module test apparatus 50'. Unlike the configuration in which the camera module test system 1 described referring to FIGS. 1 to 17 includes the coefficient data extractor 10 and the camera module test apparatus 50, the camera module test system 1a in FIG. 18 includes only a camera module test apparatus 50'. Here, the function of coefficient data extractor 10 may be implemented by the camera module test system 50'.

The camera module 100 may be accommodated in the camera module test apparatus 50', and may receive calibration data CRD that is output as an operation result of the camera module test apparatus 50'.

Figure 19:
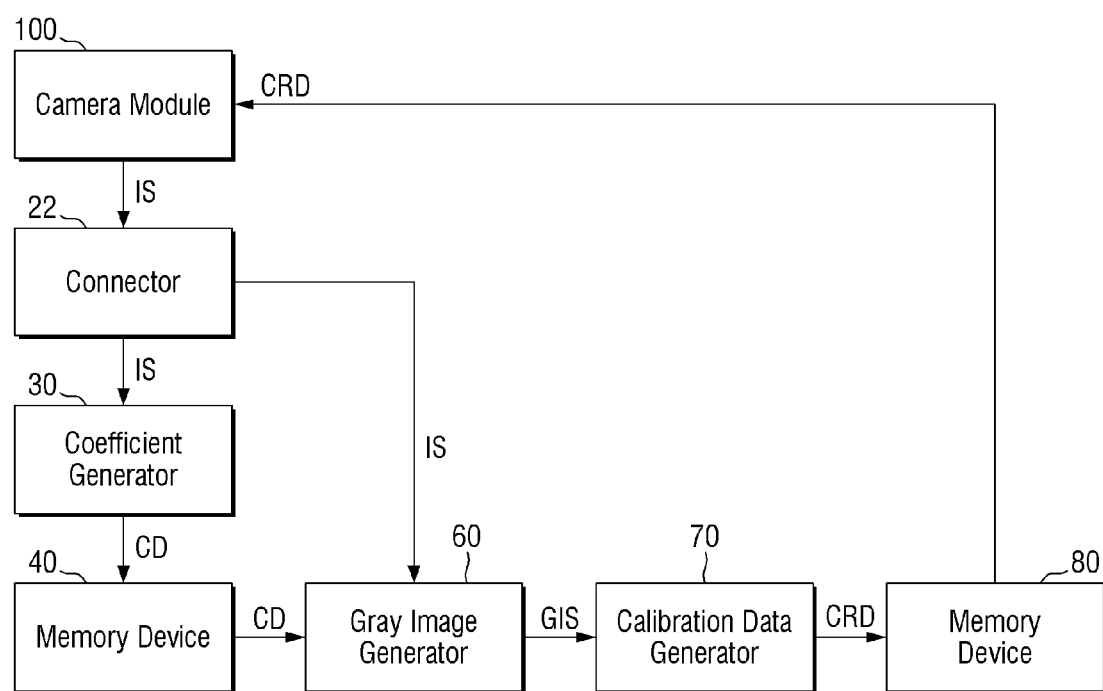
FIG. 19 illustrates a block diagram of the camera module test apparatus of FIG. 18.

Referring to FIG. 19, the camera module test apparatus 50' may include connector 22, coefficient generator 30, memory device 40, gray image generator 60, calibration data generator 70, and memory device 80.

The coefficient data extraction process and the camera module test process explained referring to FIGS. 1 through 17 may be performed by the camera module test apparatus 50'. That is, unlike the configuration in which the coefficient data extraction process and the camera module test process are separately performed as described with reference to FIGS. 1 to 17, the camera module test apparatus 50' may perform all the aforementioned processes.

The image signal IS which is output from the camera module 100 is transferred to the coefficient generator 30 through the connector 22, and the coefficient generator 30 may generate the coefficient data CD. Subsequently, the coefficient generator 30 may transfer the coefficient data CD to the memory device 40, and the memory device 40 may store the coefficient data CD.

In the subsequent process, the image signal IS which is output from the camera module 100 may be transferred to the gray image generator 60. Also, the coefficient data CD which is output from the memory device 40 may be transferred to the gray image generator 60. The gray image generator 60 may convert the image signal IS into the gray image signal GIS, using the coefficient data CD. The calibration data generator 70 may generate calibration data CRD on the basis of the generated gray image signal GIS, and the generated calibration data CRD may be stored in the memory device 80. In some embodiments, the memory device 40 and the memory device 80 may be the same memory device. Also, the calibration data CRD may be transferred to the camera module 100 and stored.

In the camera module test apparatus 50' according to embodiments of the inventive concepts, the coefficient data extraction process and the camera module test process may be performed under the same environment. That is, the coefficient data CD may be used when generating the gray image of the gray image generator 60 under the same environment.

Hereinafter, the camera module test system 1b according to some other embodiments of the inventive concepts will be described referring to FIG. 20.

Figure 20:
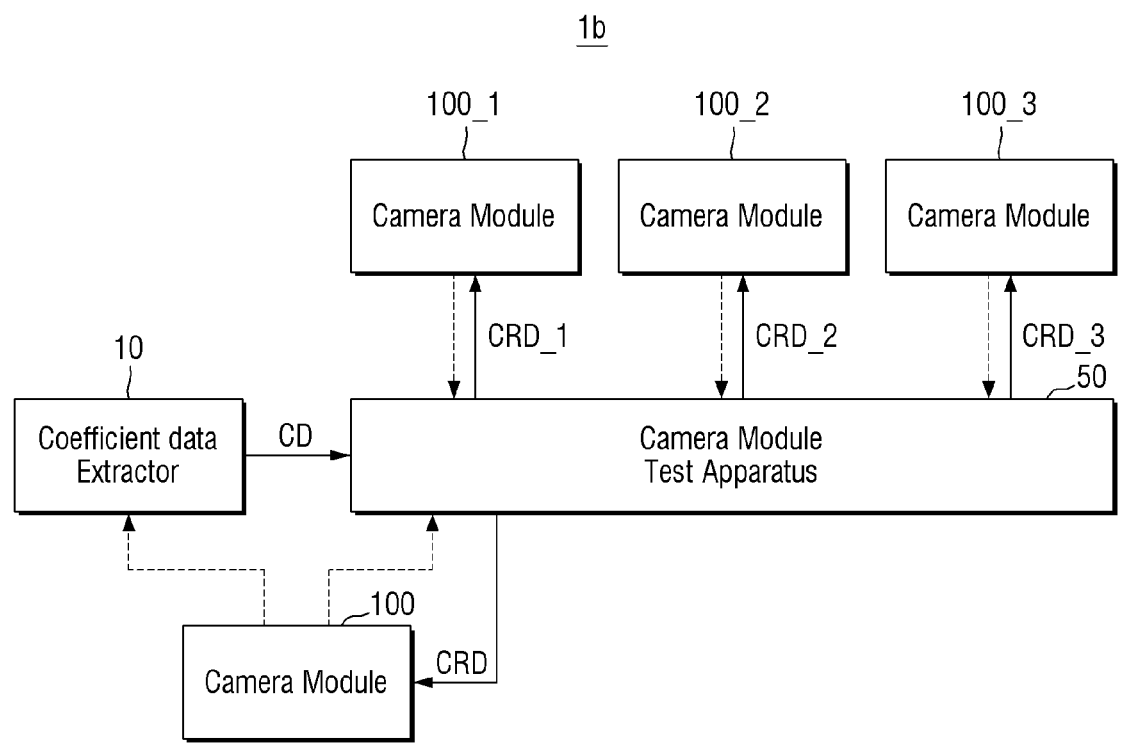
FIG. 20 illustrates a block diagram of a camera module test system according to embodiments of the inventive concepts.

FIG. 20 illustrates a block diagram of a camera module test system according to embodiments of the inventive concepts. For convenience of explanation, description of features in FIG. 20 that are the same as in FIGS. 1 to 17 will be hereinafter omitted.

Referring to FIG. 20, the camera module test system 1b may accommodate a plurality of camera modules 100, 100_1, 100_2, and 100_3. For example, the coefficient data extractor 10 may accommodate the camera module 100, and the camera module test apparatus 50 may accommodate the plurality of camera modules 100, 100_1, 100_2, and 100_3.

First, the coefficient data extractor 10 may accommodate the camera module 100 and extract the coefficient data CD thereof. The coefficient data CD may be transferred to the camera module test apparatus 50.

Subsequently, the camera module test apparatus 50 may accommodate the used camera module 100, output the calibration data CRD by the use of the image signal IS output from the camera module 100 and the coefficient data CD, and provide the calibration data CRD to the camera module 100.

Further, after the coefficient data CD is provided to the camera module test apparatus 50, a plurality of camera modules 100_1, 100_2, and 100_3 may be accommodated in the camera module test apparatus 50. Here, the plurality of camera modules 100_1, 100_2, and 100_3 may be accommodated at a same time or may be accommodated in sequence.

For example, the camera module 100_1 may be accommodated in the camera module test apparatus 50, and calibration data CRD_1 may be generated using the image signal that is output from the camera module 100_1 and the stored coefficient data CD. The calibration data CRD_1 may be provided to the camera module 100_1 and stored therein.

The camera module 100_2 may be accommodated in the camera module test apparatus 50, and calibration data CRD_2 may be generated using the image signal that is output from the camera module 100_2 and the stored coefficient data CD. The calibration data CRD_2 may be provided to the camera module 100_2 and stored therein.

The camera module 100_3 may be accommodated in the camera module test apparatus 50, and calibration data CRD_3 may be generated using the image signal that is output from the camera module 100_3 and the stored coefficient data CD. The calibration data CRD_3 may be provided to the camera module 100_3 and stored therein.

Here, patterns of the color filters of the image sensors of the plurality of camera modules 100_1, 100_2, and 100_3 may be the same as patterns of the color filters of the image sensors of the camera module 100. Also, the respective calibration data CRD, CRD_1, CRD_2 and CRD_3 may be different from each other. However, the embodiments of the inventive concepts are not limited thereto.

Since the camera module test of the plurality of camera modules 100_1, 100_2, and 100_3 is performed after the coefficient data CD is extracted, the time consumed for the camera module test can be reduced. That is, a more efficient camera module test can be performed.

Hereinafter, a camera module test system 1c according to some other embodiments of the inventive concepts will be described referring to FIGS. 21 and 22.

Figure 21:
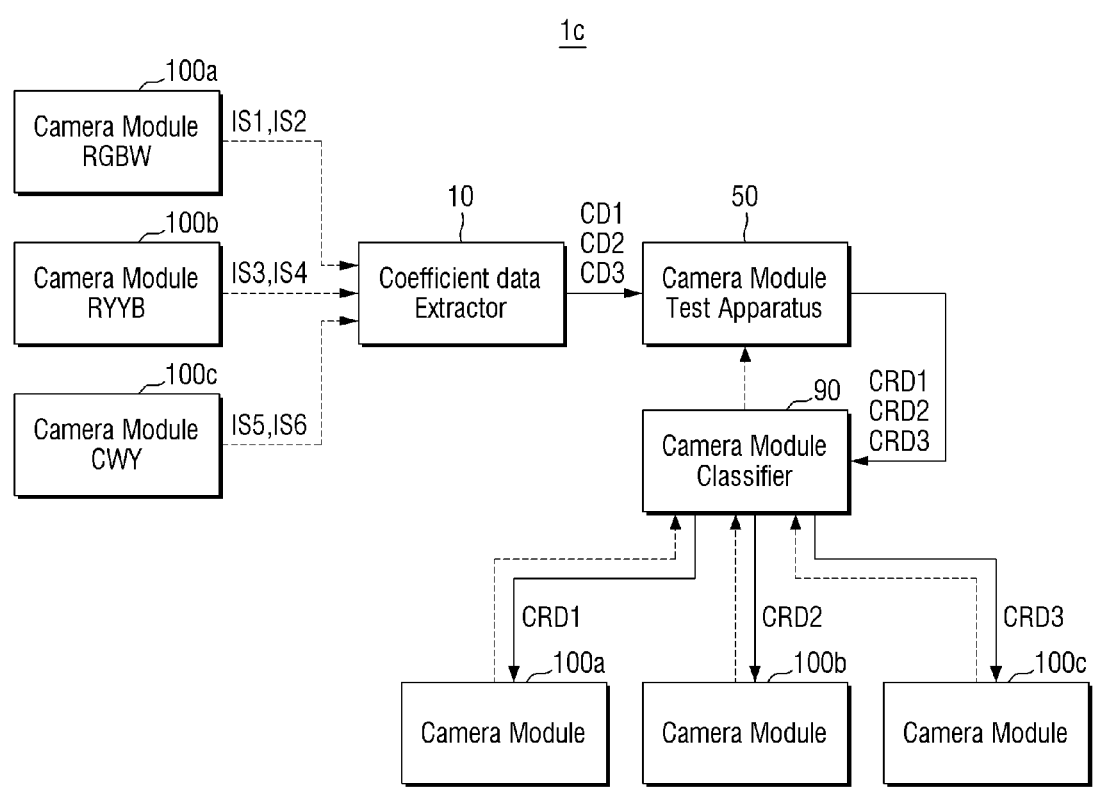
FIG. 21 illustrates a block diagram of a camera module test system according to embodiments of the inventive concepts.

FIG. 21 illustrates a block diagram of a camera module test system according to embodiments of the inventive concepts. FIG. 22 illustrates a flowchart explanatory of the operation of the camera module test system of FIG. 21. For convenience of explanation, description of features in FIGS. 21 and 22 that are the same as in FIGS. 1 to 17 will be hereinafter omitted.

Referring to FIG. 21, the camera module test system 1c may include a coefficient data extractor 10, a camera module test apparatus 50, and a camera module classifier 90.

Figure 22:
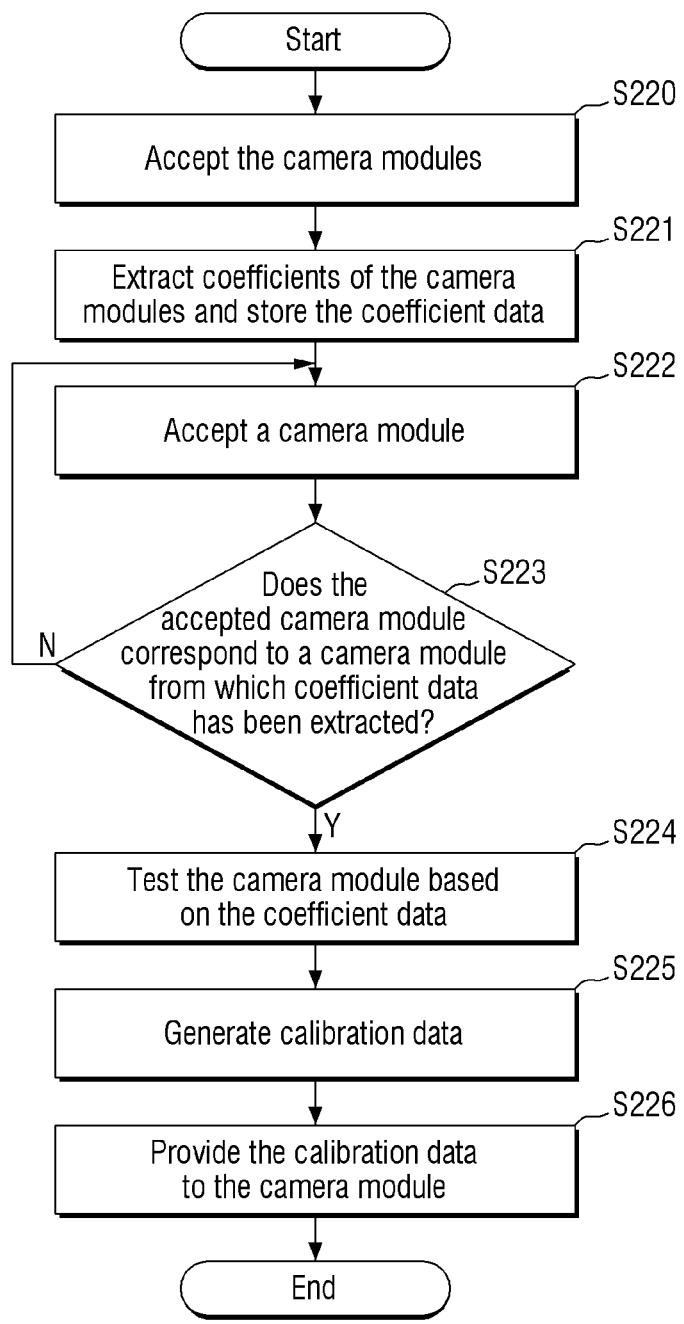
FIG. 22 illustrates a flowchart explanatory of the operation of the camera module test system of FIG. 21.

Referring to FIGS. 21 and 22, the coefficient data extractor 10 accommodates the camera modules 100a, 100b, and 100c (S220). As described previously, the coefficient data may be a ratio of a single color image signal to another color image signal. In FIG. 21, IS1 and IS2 denoted first and second color image signals of the camera module 100a, IS3 and IS4 denote third and fourth color image signals of the camera module 100b, and IS5 and IS6 denote fifth and sixth color image signals of the cameral module 100c. The coefficient data extractor 10 extracts first coefficient data CD1, second coefficient data CD2, and third coefficient data CD3 of the camera modules 100a, 100b, and 100c, and stores the extracted coefficient data CD1, CD2, and CD3 (S221). Also, coefficient data extractor 10 may provide the coefficient data CD1, CD2, and CD3 to the camera module test apparatus 50.

Here, each of the camera modules 100a, 100b, and 100c may be camera modules different from each other. For example, patterns of the color filter included in each of the camera modules 100a, 100b, and 100c may be different from each other. For example, the pattern of the color filter of the camera module 100a may be RGBW (i.e., a first color filter having a first arrangement), the pattern of the color filter of the camera module 100b may be RYYB (i.e., a second color filter having a second arrangement), and the pattern of the color filter of the camera module 100c may be CMY (i.e., a third color filter having a third arrangement). Therefore, the respective coefficient data CD1, CD2, and CD3 may also be different from each other. However, embodiments of the inventive concepts are not limited thereto.

The camera module test apparatus 50 accommodates or accepts one camera module (S222). Here, the one camera module may be provided or connected to the camera module test apparatus 50 by the camera module classifier 90.

The camera module classifier 90 may accommodate a plurality of camera modules 100a, 100b, and 100c. The camera module classifier 90 may provide (i.e., connect) the above noted one camera module of the camera modules 100a, 100b, and 100c accepted in S222 to the camera module test apparatus 50.

The camera module test apparatus 50 determines whether the provided (i.e., accepted) camera module corresponds to a camera module from which coefficient data has been extracted (S223). For example, when the camera module test apparatus 50 is provided (i.e., connected) with the camera module 100a, the camera module test apparatus 50 may determine the coefficient data CD1 as corresponding to the camera module 100a.

When the accepted camera module corresponds to a camera module from which the coefficient data has been extracted (Yes in S223), the camera module test apparatus 50 tests the accepted camera module on the basis of the coefficient data CD (S224). That is, the camera module test apparatus 50 may convert the image signal IS, which is output from the accepted camera module, by the use of the corresponding coefficient data CD. When the accepted camera module does not correspond to a camera module from which coefficient data has been extracted (No in S223), operation returns to S222 and another camera module may be accepted.

The camera module test apparatus 50 generates the calibration data CRD using the generated gray image signal GIS (S225). Here, in accordance with the above noted example in which the accepted camera module is the camera module 100a, calibration data CRD1 may be generated. If the camera module 100b is tested, calibration data CRD2 may be generated, and if the camera module 100c is tested, calibration data CRD3 may be generated.

Subsequently, the camera module test apparatus 50 provides calibration data to the corresponding camera module (S226). For example, calibration data CRD1, CRD2, and CRD3 may be respectively provided to the camera modules 100a, 100b, and 100c. For example, the camera module test apparatus 50 may provide the calibration data CRD1, CRD2, and CRD3 to the camera module classifier 90. Subsequently, the camera module classifier 90 may provide the calibration data CRD1 to the camera module 100a, and may provide the calibration data CRD2 to the camera module 100b. The camera module classifier 90 may provide calibration data CRD3 to the camera module 100c.

Accordingly, the camera module test system 1c may efficiently store the calibration data CRD1, CRD2, and CRD3 in each of the camera modules 100a, 100b, and 100c.

Hereinafter, an electronic apparatus 2000 according to some other embodiments of the inventive concepts will be described referring to FIGS. 23 and 24.

Figure 23:
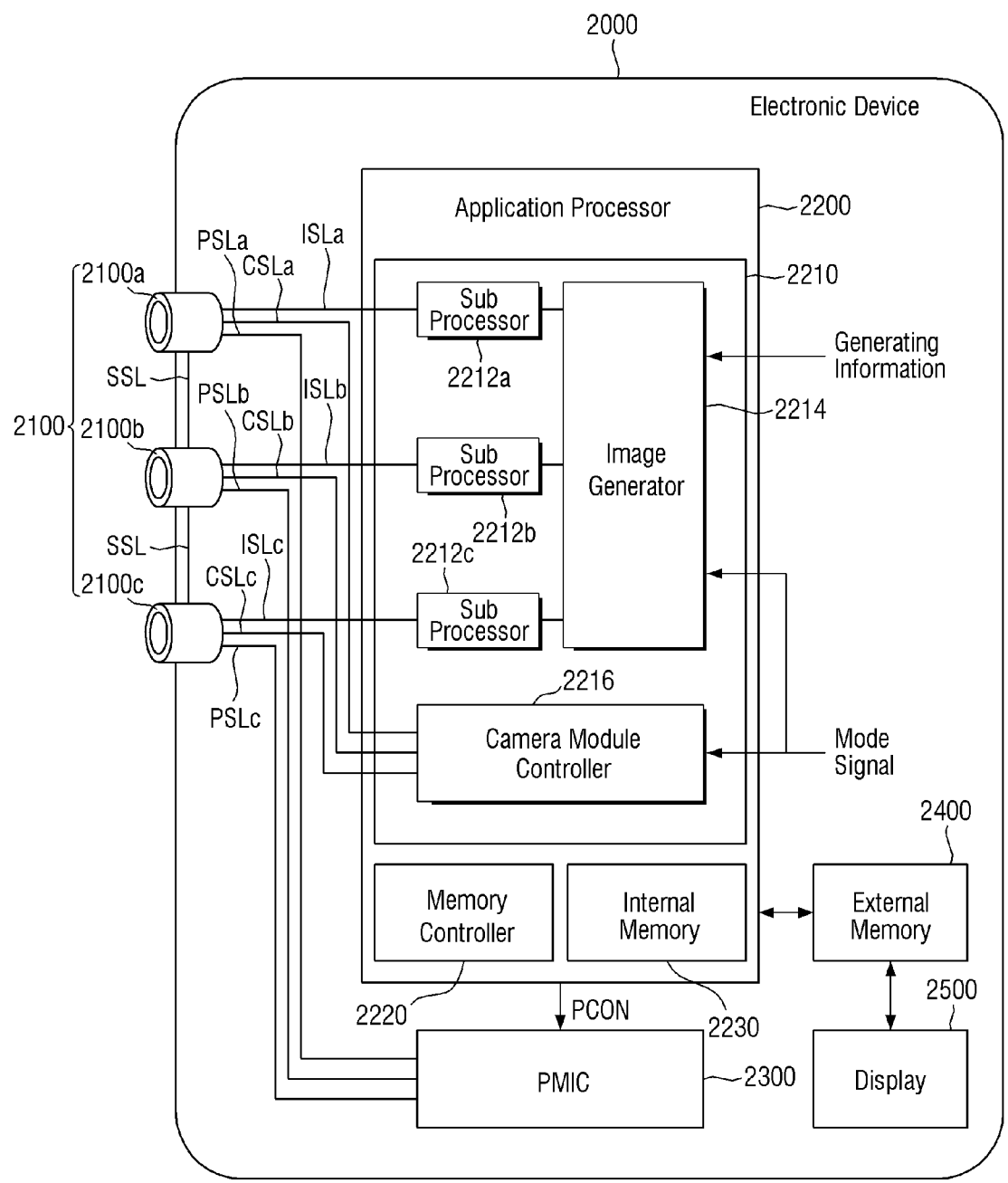
FIG. 23 illustrates a block diagram explanatory of an electronic device including a multi-camera module according to embodiments of the inventive concepts.

FIG. 23 illustrates a block diagram explanatory of an electronic device including a multi-camera module according to embodiments of the inventive concepts. FIG. 24 illustrates a detailed block diagram of the camera module of FIG. 23. For convenience of explanation, description of features in FIGS. 23 and 24 that are the same as in FIGS. 1 to 22 will be hereinafter omitted.

Referring to FIG. 23, the electronic device 2000 may include a camera module group 2100, an application processor 2200, a power management integrated circuit (PMIC) 2300, an external memory 2400 and a display 2500.

The camera module group 2100 may include a plurality of camera modules 2100a, 2100b, and 2100c. Even though the drawings show an embodiment in which three camera modules 2100a, 2100b, and 2100c are included, the embodiments are not limited thereto. In some embodiments, the camera module group 2100 may be modified to include only two camera modules. Also, in some embodiments, the camera module group 2100 may also be disposed to include n (n is a natural number of 4 or more) camera modules.

Here, any one of the three camera modules 2100a, 2100b, and 2100c may include the camera module 100 described using FIGS. 1 to 22. That is, the camera module 100 tested by the camera module test systems 1, 1a, 1b, and 1c may be placed in the electronic device 2000.

Hereinafter, the detailed configuration of the camera module 2100b will be described in more detail referring to FIG. 24. However, the following description may also be similarly applied to other camera modules 2100a and 2100c, depending on the embodiments.

Figure 24:
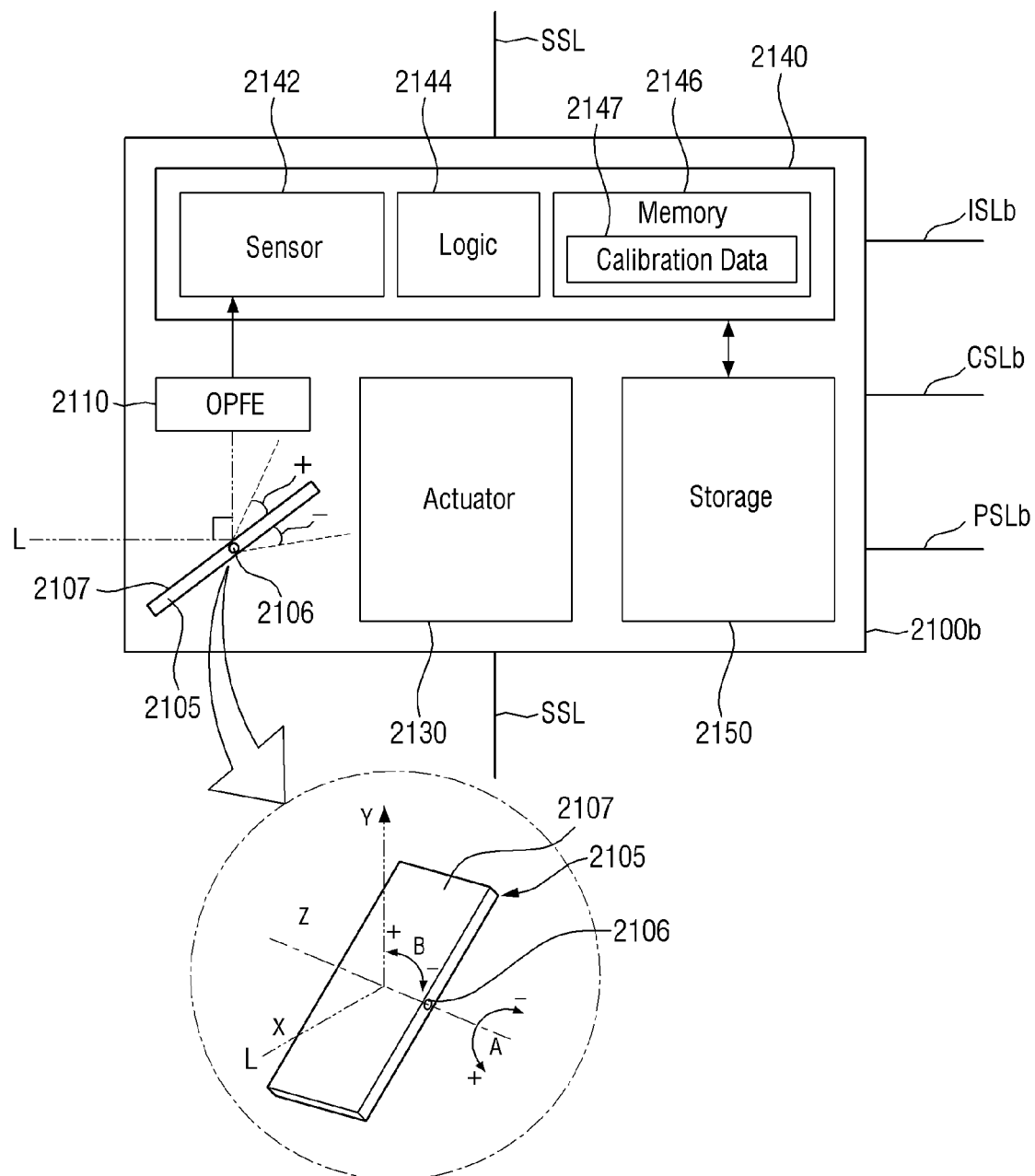
FIG. 24 illustrates a detailed block diagram of the camera module of FIG. 23.

Referring to FIG. 24, the camera module 2100b may include a prism 2105, an optical path folding element (hereinafter, "OPFE") 2110, an actuator 2130, an image sensing device 2140, and a storage 2150.

The prism 2105 may include a reflective face 2107 of a light-reflecting material that deforms a path of light L that is incident from the outside.

In some embodiments, the prism 2105 may change the path of light L incident in a first direction X to a second direction Y perpendicular to the first direction X. Further, the prism 2105 may rotate the reflective face 2107 of the light-reflecting material in a direction A around a central axis 2106, or rotate the reflective face 2107 in a direction B around the central axis 2106 to change the path of the light L incident in the first direction to the vertical second direction Y. The OPFE 2110 may also move in a third direction Z perpendicular to the first direction X and the second direction Y.

In some embodiments, as shown, although a maximum rotation angle of the prism 2105 in the direction A is 15 degrees or less in a positive (+) direction A, and may be greater than 15 degrees in a negative (−) direction A, the embodiments are not limited thereto.

In some embodiments, the prism 2105 may move around 20 degrees, or between 10 and 20 degrees, or between 15 and 20 degrees in a positive (+) or negative (−) direction B. Here, a moving angle may move at the same angle in the positive (+) or negative (−) direction B, or may move to almost the similar angle in the range of about 1 degree.

In some embodiments, the prism 2105 may move the reflective face 2106 of the light-reflective material in a third direction (e.g., the direction Z) parallel to the extension direction of the central axis 2106.

The OPFE 2110 may include, for example, an optical lens including m (here, m is a natural number) groups. The m lenses may move in the second direction Y to change an optical zoom ratio of the camera module 2100b. For example, when a basic optical zoom ratio of the camera module 2100b is defined as Zr, in the case of moving the m optical lenses included in the OPFE 2110, the optical zoom ratio of the camera module 2100b may be changed to an optical zoom ratio of 3Zr or 5Zr or higher.

The actuator 2130 may move the OPFE, 2110 or an optical lens (hereinafter referred to as an optical lens) to a specific position. For example, the actuator 2130 may adjust the position of the optical lens so that the image sensor 2142 is located at the focal length of the optical lens for accurate sensing.

The image sensing apparatus 2140 may include an image sensor 2142, control logic 2144, and a memory 2146. The image sensor 2142 may sense the image to be sensed using the light L provided through the optical lens. In some embodiments, the image sensor 2142 may include the image sensor 101 previously described.

The control logic 2144 may control the overall operation of the camera module 2100b. In an embodiment, the control logic 2144 may be a control logic circuit and may include a processor configured to perform predetermined operations. For example, the control logic 2144 may control the operation of the camera module 2100b according to the control signal provided through the control signal line CSLb.

The memory 2146 may store information necessary for the operation of the camera module 2100b, such as calibration data 2147. The calibration data 2147 may include information necessary for the camera module 2100b to generate image data, using light L provided from the outside. The calibration data 2147 may include, for example, above-mentioned information on the degree of rotation, information on the focal length, information on the optical axis, and the like. If the camera module 2100b is provided in the form of a multi-state camera whose focal length changes depending on the position of the optical lens, the calibration data 2147 may include focal length values for each position (or for each state) of the optical lens 2147, and information about auto-focusing. Here, the memory 2146 may include the memory device 190 of the camera module 100 described with respect to FIG. 2 for example, and the calibration data 2147 may include the calibration data CRD stored in the memory device 190.

The storage 2150 may store the image data sensed through the image sensor 2142. In some embodiments the storage 2150 may be placed outside the image sensing device 2140, and may be provided in the form of being stacked with sensor chips constituting the image sensing device 2140. In some embodiments, although the storage 2150 may be provided as EEPROM (Electrically Erasable Programmable Read-Only Memory), the embodiments are not limited thereto. The storage 2150 may be implemented by a memory chip.

Referring to FIGS. 23 and 24 together, in some embodiments, each of the plurality of camera modules 2100a, 2100b, and 2100c may include an actuator 2130. Accordingly, each of the plurality of camera modules 2100a, 2100b, and 2100c may include calibration data 2147 that are the same as or different from each other, depending on the operation of the actuator 2130 included therein.

In some embodiments, although one camera module (e.g., 2100b) of the plurality of camera modules 2100a, 2100b, and 2100c may be a folded lens type camera module including the prism 2105 and the OPFE 2110 described above, and the remaining camera modules (e.g., 2100a, 2100c) may be a vertical type camera module which does not include the prism 2105 and the OPFE 2110, the embodiments are not limited thereto.

In some embodiments, one camera module (e.g., 2100c) of the plurality of camera modules 2100a, 2100b, and 2100c may be a vertical type depth camera that extracts depth information, using for example IR (Infrared Ray). In this case, the application processor 2200 may merge the image data provided from such a depth camera with the image data provided from other camera modules (e.g., 2100a or 2100b) to generate a three-dimensional (3D) depth image.

In some embodiments, at least two camera modules (e.g., 2100a, 2100b) among the plurality of camera modules 2100a, 2100b, and 2100c may have different fields of view (viewing angles). In this case, for example, although the optical lenses of at least two camera modules (e.g., 2100a, 2100b) among the plurality of camera modules 2100a, 2100b, and 2100c may be different from each other, the embodiments are not limited thereto.

Also, in some embodiments, the fields of view of each of the plurality of camera modules 2100a, 2100b, and 2100c may be different from each other. In this case, although the optical lenses included in each of the plurality of camera modules 2100a, 2100b, and 2100c may be different from each other, the embodiments are not limited thereto.

In some embodiments, each of the plurality of camera modules 2100a, 2100b, and 2100c may be placed to be physically separated from each other. That is, the plurality of camera modules 2100a, 2100b, and 2100c do not dividedly use the sensing region of one image sensor 2142, but an independent image sensor 2142 may be placed inside each of the plurality of camera modules 2100a, 2100b, and 2100c.

Referring to FIG. 23 again, the application processor 2200 may include an image processing device 2210, a memory controller 2220, and an internal memory 2230. The application processor 2200 may be provided separately from the plurality of camera modules 2100a, 2100b, and 2100c. For example, the application processor 2200 and the plurality of camera modules 2100a, 2100b, and 2100c may be provided separately by or at separate semiconductor chips.

The image processing device 2210 may include a plurality of sub-image processors 2212a, 2212b and 2212c, an image generator 2214, and a camera module controller 2216.

The image processing device 2210 may include a plurality of sub-image processors 2212a, 2212b and 2212c corresponding to the number of the plurality of camera modules 2100a, 2100b, and 2100c.

The image data generated from each of the camera modules 2100a, 2100b, and 2100c may be provided to the corresponding sub-image processors 2212a, 2212b, and 2212c through the image signal lines ISLa, ISLb and ISLc separated from each other. For example, the image data generated from the camera module 2100a is provided to the sub-image processor 2212a through the image signal line ISLa, the image data generated from the camera module 2100b is provided to the sub-image processor 2212b through the image signal line ISLb, and the image data generated from the camera module 2100c may be provided to the sub-image processor 2212c through the image signal line ISLc. Although such an image data transmission may be performed using, for example, a camera serial interface (CSI) based on MIPI® (Mobile Industry Processor Interface), the embodiments are not limited thereto.

On the other hand, in some embodiments, one sub-image processor may be placed to correspond to a plurality of camera modules. For example, the sub-image processor 2212a and the sub-image processor 2212c may not be provided separately from each other as shown, but may instead be provided by being integrated into a single sub-image processor. The image data provided from the camera module 2100a and the camera module 2100c may be selected through a selection element (e.g., a multiplexer) or the like, and then provided to the integrated sub-image processor.

The image data provided to each of the sub-image processors 2212a, 2212b, and 2212c may be provided to the image generator 2214. The image generator 2214 may generate an output image using the image data provided from the respective sub-image processors 2212a, 2212b, and 2212c according to image generating information or a mode signal.

Specifically, the image generator 2214 may merge at least some of the image data generated from the camera modules 2100a, 2100b, and 2100c having different viewing angles according to the image generating information or the mode signal to generate an output image. Further, the image generator 2214 may generate an output image, by selecting any one of the image data generated from the camera modules 2100a, 2100b, and 2100c having different viewing angles according to the image generating information or the mode signal.

In some embodiments, the image generating information may include a zoom signal (or zoom factor). Also, in some embodiments, the mode signal may be, for example, a signal based on the mode selected from the user.

When the image generating information is a zoom signal (zoom factor) and each of the camera modules 2100a, 2100b, and 2100c have different fields of view (viewing angle), the image generator 2214 may perform different operations depending on the type of the zoom signal. For example, when the zoom signal is a first signal, the image data that is output from the camera module 2100a is merged with the image data that is output from the camera module 2100c, and then the output image may be generated using the merged image signal and the image data that is not merged and output from the camera module 2100b. If the zoom signal is a second signal different from the first signal, the image generator 2214 does not perform the image data merging, and may generate the output image by selecting any one of the image data that is output from the respective camera modules 2100a, 2100b, and 2100c. However, the embodiments are not limited thereto, and the method of processing the image data may be modified as necessary.

In some embodiments, the image generator 2214 may receive a plurality of image data with different exposure times from at least one of the plurality of sub-image processors 2212a, 2212b, and 2212c, and perform an HDR (high dynamic range) process on the plurality of image data, thereby generating merged image data with an increased dynamic range.

The camera module controller 2216 may provide control signals to each of the camera modules 2100a, 2100b, and 2100c. The control signals generated from the camera module controller 2216 may be provided to the corresponding camera modules 2100a, 2100b, and 2100c through the control signal lines CSLa, CSLb and CSLc separated from each other.

One of the plurality of camera modules 2100a, 2100b, and 2100c may be designated as a master camera (e.g., 2100a) and the remaining camera modules (e.g., 2100b, 2100c) may be designated as a slave camera, depending on the image generating information including the zoom signal or the mode signal. Such information is included in the control signal and may be provided to the corresponding camera modules 2100a, 2100b, and 2100c through the control signal lines CSLa, CSLb and CSLc separated from each other.

The camera modules that operate as master and slave may be modified, depending on the zoom factor or the operating mode signal. For example, when the viewing angle of the camera module 2100a is wider than the viewing angle of the camera module 2100c and the zoom factor shows a low zoom ratio, the camera module 2100c may operate as a master and the camera module 2100a may operate as a slave. On the contrary, when the zoom factor shows a high zoom ratio, the camera module 2100a may operate as a master and the camera module 2100c may operate as a slave.

In some embodiments, the control signal provided from the camera module controller 2216 to each of the camera modules 2100a, 2100b, and 2100c may include a sync enable signal. For example, when the camera module 2100b is the master camera and the camera modules 2100a and 2100c are slave cameras, the camera module controller 2216 may transmit a sync enable signal to the camera module 2100b. The camera module 2100b, which has received such a sync enable signal, generates a sync signal on the basis of the received sync enable signal, and may provide the generated sync signal to the camera modules 2100a and 2100c through the sync signal line SSL. The camera module 2100b and the camera modules 2100a and 2100c may thus be synchronized with such a sync signal, and may transmit the image data to the application processor 2200.

In some embodiments, the control signal provided from the camera module controller 2216 to the plurality of camera modules 2100a, 2100b, and 2100c may include mode information according to the mode signal. The plurality of camera modules 2100a, 2100b, and 2100c may operate in the first operating mode or the second operating mode in relation to the sensing speed, on the basis of the mode information.

The plurality of camera modules 2100a, 2100b, and 2100c may generate an image signal at the first speed in the first operating mode (for example, generate an image signal of the first frame rate), encode the image single at a second speed higher than the first speed (e.g., encode an image signal of a second frame rate higher than the first frame rate), and transmit the encoded image signal to the application processor 2200. The second speed may be equal to or less than 30 times the first speed.

The application processor 2200 stores the received image signal, that is to say, the encoded image signal, in a memory 2230 provided inside or a storage 2400 outside the application processor 2200. After that, the application processor 2200 may read and decode the encoded image signal from the memory 2230 or the storage 2400, and display the image data generated on the basis of the decoded image signal. For example, the corresponding sub-processors among the plurality of sub-processors 2212a, 2212b, and 2212c of the image processing device 2210 may perform decoding and may also perform image processing on the decoded image signal. For example, the image data generated on the basis of the decoded image signal may be displayed on the display 2500.

The plurality of camera modules 2100a, 2100b, and 2100c may generate an image signal at a third speed lower than the first speed in the second operating mode (e.g., generate an image signal of a third frame rate lower than the first frame rate), and transmit the image signal to the application processor 2200. The image signal provided to the application processor 2200 is a non-encoded signal. The application processor 2200 may perform image processing on the received image signal or store the image signal in the memory 2230 or the storage 2400.

The PMIC 2300 may supply power, for example, a power supply voltage, to each of the plurality of camera modules 2100a, 2100b, and 2100c. For example, the PMIC 2300 may supply first power to the camera module 2100a through the power signal line PSLa, supply second power to the camera module 2100b through the power signal line PSLb, and supply third power to the camera module 2100c through the power signal line PSLc, under the control of the application processor 2200.

The PMIC 2300 may generate power corresponding to each of the plurality of camera modules 2100a, 2100b, and 2100c and adjust the level of power, in response to the power control signal PCON from the application processor 2200. The power control signal PCON may include a power adjustment signal for each operating mode of the plurality of camera modules 2100a, 2100b, and 2100c. For example, the operating mode may include a low power mode, and the power control signal PCON may include information about the camera module that operates in the low power mode and the power level to be set. The levels of power provided to each of the plurality of camera modules 2100a, 2100b, and 2100c may be the same as or different from each other. Also, the power level may be changed dynamically.

In concluding the detailed description, those skilled in the art should appreciate that many variations and modifications may be made to the embodiments without substantially departing from the inventive concepts. Therefore, the disclosed embodiments of the inventive concepts are used in a generic and descriptive sense only and not for purposes of limitation.

What is claimed is:

1. A camera module test apparatus comprising:
   a memory configured to store first coefficient data generated based on a ratio of a first color image signal and a second color image signal output by sensing light penetrating through a first color filter having a first arrangement, and second coefficient data generated based on a ratio of a third color image signal and a fourth color image signal output by sensing the light penetrating through a second color filter having a second arrangement different from the first arrangement; and an image conversion device configured to select one of the first coefficient data and the second coefficient data based on an arrangement of color filters included in an image sensor of a camera module to convert an image output from the image sensor into a converted image.

2. The camera module test apparatus of claim 1, wherein when the arrangement of the color filters included in the image sensor of the camera module has the first arrangement, the image conversion device is configured to convert the image output from the image sensor using the first coefficient data.

3. The camera module test apparatus of claim 1, wherein the converted image includes a gray image.

4. The camera module test apparatus of claim 1, wherein the first arrangement of the first color filter has an RGBW Bayer pattern.

5. The camera module test apparatus of claim 4, wherein the first color image signal includes a white color pixel value, and the second color image signal includes at least one of a red color pixel value, a green color pixel value, and a blue color pixel value.

6. The camera module test apparatus of claim 1, wherein the first and second arrangements do not include an RGB Bayer pattern.

7. The camera module test apparatus of claim 1, further comprising:

a calibration data generator configured to generate calibration data of the converted image, wherein the calibration data is transferred to the camera module.

8. A camera module test method comprising:

providing a first camera module having a first color filter;

receiving a first image signal output by sensing light penetrating through the first color filter of the first camera module;

generating first coefficient data corresponding to a ratio of a plurality of color image signals included in the first image signal;

storing the first coefficient data;

providing a second camera module having a second color filter;

checking whether the second color filter matches the first color filter; and when the second color filter matches the first color filter, generating a first converted pattern image signal based on the stored first coefficient data and a second image signal output by sensing light penetrating through the second color filter of the second camera module, and generating calibration data of the first converted pattern image signal.

9. The camera module test method of claim 8, further comprising:

providing a third camera module having a third color filter different from the first color filter;

receiving a third image signal output by sensing the light penetrating through the third color filter of the third camera module; and generating and storing second coefficient data corresponding to a ratio of a plurality of color image signals included in the third image signal.

10. The camera module test method of claim 9, further comprising:

checking whether the second color filter of the second camera module matches the third color filter; and when the second color filter matches the third color filter, generating a second converted pattern image signal based on the stored second coefficient data and a third image signal output by sensing light penetrating through the third color filter of the third camera module, and generating calibration data of the second converted pattern image signal.

11. A camera module test apparatus comprising:

a connector configured to be removably connected to a camera module, the camera module including an image sensor that outputs an image signal responsive to incident light;

a coefficient generator configured to generate coefficient data corresponding to a ratio of a plurality of color image signals included in the image signal, the image signal provided to the coefficient generator through the connector;

a memory device configured to store the coefficient data;

an image converter configured to receive the image signal through the connector and convert the image signal into a converted pattern image signal using the stored coefficient data; and a calibration data generator configured to generate calibration data based on the converted pattern image signal.

12. The camera module test apparatus of claim 11, wherein the calibration data generator is further configured to store the calibration data in the memory device, and the stored calibration data is transferred from the memory device to the camera module.

13. The camera module test apparatus of claim 11, wherein the converted pattern image signal is a gray image signal.

14. The camera module test apparatus of claim 11, wherein the plurality of color image signals comprise a first color image signal including a white color pixel value, and a second color image signal including at least one of a red color pixel value, a green color pixel value, and a blue color pixel value.

15. The camera module test apparatus of claim 11, further comprising a light source emitter configured to transmit the light to be incident on the image sensor of the camera module as removably connected to the connector.

* * * * *